United States Patent
Nilsson et al.

(10) Patent No.: US 11,777,619 B2
(45) Date of Patent: Oct. 3, 2023

(54) DIELECTRIC WAVEGUIDE SIGNAL TRANSFER FUNCTION COMPENSATION

(71) Applicant: Telefonaktiebolaget LM Ericsson (publ), Stockholm (SE)

(72) Inventors: Magnus Nilsson, Lund (SE); Peter Jakobsson, Lund (SE); Per Ingelhag, Alingsås (SE); Sten Wallin, Enskede (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/798,410

(22) PCT Filed: Feb. 9, 2021

(86) PCT No.: PCT/EP2021/052994
§ 371 (c)(1),
(2) Date: Aug. 9, 2022

(87) PCT Pub. No.: WO2021/160571
PCT Pub. Date: Aug. 19, 2021

(65) Prior Publication Data
US 2023/0080607 A1    Mar. 16, 2023

Related U.S. Application Data

(60) Provisional application No. 62/972,372, filed on Feb. 10, 2020.

(51) Int. Cl.
*H04B 17/14* (2015.01)
*H04B 17/21* (2015.01)

(52) U.S. Cl.
CPC ............. *H04B 17/14* (2015.01); *H04B 17/21* (2015.01)

(58) Field of Classification Search
CPC ..................................................... H04B 17/14
See application file for complete search history.

(56) References Cited

U.S. PATENT DOCUMENTS

| 4,812,855 A | 3/1989 | Coe et al. |
| 6,054,960 A | 4/2000 | Tolson et al. |
| (Continued) | | |

FOREIGN PATENT DOCUMENTS

| CN | 101449190 A | 6/2009 |
| CN | 102685673 A | 9/2012 |
| (Continued) | | |

OTHER PUBLICATIONS

3GPP, "3rd Generation Partnership Project; Technical Specification Group Radio Access Network; NR; Base Station (BS) radio transmission and reception (Release 17)", 3GPP TS 38.104 V17.0.0, Dec. 2020, 295 pages.

(Continued)

*Primary Examiner* — Hsinchun Liao
(74) *Attorney, Agent, or Firm* — Murphy, Bilak & Homiller, PLLC

(57) ABSTRACT

Methods for determining calibration parameters to correct for frequency responses of one or more dielectric waveguides coupling a control unit to a first antenna node or to a series of antenna nodes that includes the first antenna node. An example method comprises transmitting, via a first dielectric waveguide coupling the control unit to the first antenna node, a radiofrequency (RF) test signal having a signal bandwidth covering a bandwidth of interest. The method further comprises receiving, via a second dielectric waveguide coupling the control unit to the first antenna node, a looped-back version of the transmitted RF test signal, and estimating a first one-way frequency response corresponding to the first (or second) dielectric waveguide, (Continued)

based on the RF test signal and the received loop-back version of the transmitted RF test signal.

20 Claims, 11 Drawing Sheets

(56) References Cited

U.S. PATENT DOCUMENTS

| | | | |
|---|---|---|---|
| 6,975,877 B1 | 12/2005 | Dergun et al. | |
| 7,372,424 B2 | 5/2008 | Mohuchy et al. | |
| 8,203,483 B2 | 6/2012 | Richards | |
| 8,344,949 B2 | 1/2013 | Moshfeghi | |
| 9,806,818 B2 | 10/2017 | Henry et al. | |
| 9,960,849 B1 | 5/2018 | Dogiamis et al. | |
| 10,051,587 B2 | 8/2018 | Jayaraman et al. | |
| 10,079,668 B2 | 9/2018 | Dogiamis et al. | |
| 10,231,130 B2 | 3/2019 | Sunay et al. | |
| 11,349,530 B2 | 5/2022 | Frenger et al. | |
| 2001/0045915 A1 | 11/2001 | Moren | |
| 2006/0017607 A1* | 1/2006 | Hayata | G01S 7/282 342/134 |
| 2006/0209670 A1 | 9/2006 | Gorokhov et al. | |
| 2007/0081557 A1 | 4/2007 | Binetti et al. | |
| 2007/0269170 A1 | 11/2007 | Easton et al. | |
| 2008/0204330 A1 | 8/2008 | Hsiao et al. | |
| 2008/0318614 A1 | 12/2008 | Iizuka et al. | |
| 2009/0122782 A1 | 5/2009 | Horn et al. | |
| 2009/0147768 A1 | 6/2009 | Ji et al. | |
| 2010/0067515 A1 | 3/2010 | Chin et al. | |
| 2010/0067588 A1 | 3/2010 | Takano | |
| 2010/0238917 A1 | 9/2010 | Silverman et al. | |
| 2011/0200325 A1 | 8/2011 | Kobyakov et al. | |
| 2011/0216660 A1 | 9/2011 | Lee et al. | |
| 2011/0280287 A1* | 11/2011 | Cheng | H04W 72/21 375/267 |
| 2012/0027361 A1 | 2/2012 | Brower et al. | |
| 2012/0120874 A1 | 5/2012 | McLaughlin et al. | |
| 2012/0315938 A1 | 12/2012 | Van et al. | |
| 2013/0272696 A1 | 10/2013 | Webb et al. | |
| 2013/0285879 A1 | 10/2013 | Wheeler | |
| 2014/0029689 A1 | 1/2014 | Liu et al. | |
| 2014/0037294 A1 | 2/2014 | Cox et al. | |
| 2014/0132477 A1 | 5/2014 | Chan et al. | |
| 2014/0211779 A1 | 7/2014 | Caire et al. | |
| 2014/0362840 A1 | 12/2014 | Wong et al. | |
| 2015/0003261 A1 | 1/2015 | Silverman et al. | |
| 2015/0162751 A1 | 6/2015 | Leabman et al. | |
| 2015/0372744 A1 | 12/2015 | Lehtinen | |
| 2016/0112263 A1 | 4/2016 | Henry et al. | |
| 2016/0277160 A1 | 9/2016 | Lim et al. | |
| 2016/0323925 A1 | 11/2016 | Alanen et al. | |
| 2016/0360533 A1 | 12/2016 | Bennett et al. | |
| 2017/0195109 A1 | 7/2017 | Perez-Cruz et al. | |
| 2017/0195140 A1 | 7/2017 | Yi et al. | |
| 2017/0264011 A1* | 9/2017 | Kim | H01Q 13/0275 |
| 2017/0271745 A1 | 9/2017 | Yun et al. | |
| 2017/0279515 A1 | 9/2017 | Wu et al. | |
| 2017/0295550 A1 | 10/2017 | Amizur et al. | |
| 2018/0041980 A1 | 2/2018 | Virginas et al. | |
| 2018/0109392 A1 | 4/2018 | Gerszberg et al. | |
| 2018/0152226 A1 | 5/2018 | Li et al. | |
| 2019/0229821 A1 | 7/2019 | Liu | |
| 2019/0260459 A1 | 8/2019 | Jeon et al. | |
| 2019/0261202 A1 | 8/2019 | Tang et al. | |
| 2019/0361180 A1* | 11/2019 | Lam | G02B 6/12 |
| 2019/0363763 A1 | 11/2019 | Frenger et al. | |

FOREIGN PATENT DOCUMENTS

| | | | |
|---|---|---|---|
| CN | 102754365 A | 10/2012 | |
| CN | 103222108 A | 7/2013 | |
| CN | 108418614 A | 8/2018 | |
| EP | 0667068 A1 | 8/1995 | |
| EP | 0830754 A1 | 3/1998 | |
| EP | 2214261 A1 | 8/2010 | |
| EP | 2169769 B1 | 1/2011 | |
| EP | 2515374 A2 | 10/2012 | |
| EP | 2629363 A1 | 8/2013 | |
| EP | 2999155 A1 | 3/2016 | |
| GB | 1321582 A | 6/1973 | |
| JP | 2004503991 A | 2/2004 | |
| JP | 2008182733 A | 8/2008 | |
| JP | 2009527145 A | 7/2009 | |
| JP | 2009537964 A | 10/2009 | |
| JP | 2014017678 A | 1/2014 | |
| KR | 20190098693 A | 8/2019 | |
| WO | 9506365 A1 | 3/1995 | |
| WO | 9641430 A1 | 12/1996 | |
| WO | 0007307 A2 | 2/2000 | |
| WO | 0197465 A1 | 12/2001 | |
| WO | 2007142805 A2 | 12/2007 | |
| WO | 2010086173 A1 | 8/2010 | |
| WO | 2016039842 A1 | 3/2016 | |
| WO | 2016115546 A1 | 7/2016 | |
| WO | 2018103897 A1 | 6/2018 | |
| WO | 2019101290 A1 | 5/2019 | |
| WO | 2019152793 A1 | 8/2019 | |
| WO | 2018103897 A9 | 10/2019 | |
| WO | 2019240808 A1 | 12/2019 | |

OTHER PUBLICATIONS

3GPP, "3rd Generation Partnership Project; Technical Specification Group Radio Access Network; NR; Study on Integrated Access and Backhaul; (Release 16)", 3GPP TR 38.874 V.16.0.0, Dec. 2018, 111 pages.

Dahlman, Erik, et al., "5G NR The Next Generation Wireless Access Technology", Academic Press, Elsevier Ltd., 2018, 469 pages.

Interdonato, Giovanni, "Signal Processing Aspects of Cell-Free Massive MIMO", Linköping Studies in Science and Technology Licentiate Thesis No. 1817, 2018, 1-49.

Interdonato, Giovanni, et al., "Ubiquitous Cell-Free Massive MIMO Communications", arXiv:1804.03421v4 [cs.IT], Sep. 6, 2019, 13 pages.

Narevsky, Nathan, et al., "eWallpaper Burst-Mode Serial Link", BWRC Summer Retreat, May 18-20, 2014, 1-1.

Preuss, Robert D., et al., "Two-Way Synchronization for Coordinated Multicell Retrodirective Downlink Beamforming", IEEE Transactions on Signal Processing, vol. 59, No. 11, Nov. 2011, 1-13.

Puglielli, Antonio, et al., "Design of Energy- and Cost-Efficient Massive MIMO Arrays", Proceedings of the IEEE, vol. 104, No. 3, Mar. 2016, 1-21.

Zhang, Yuxian, et al., "Measurement and Evaluations of Coherent Joint Transmission for 5G Networks", 2017 IEEE Vehicular Technology Conference (VTC Spring), Jun. 4, 2017, 1-5.

* cited by examiner

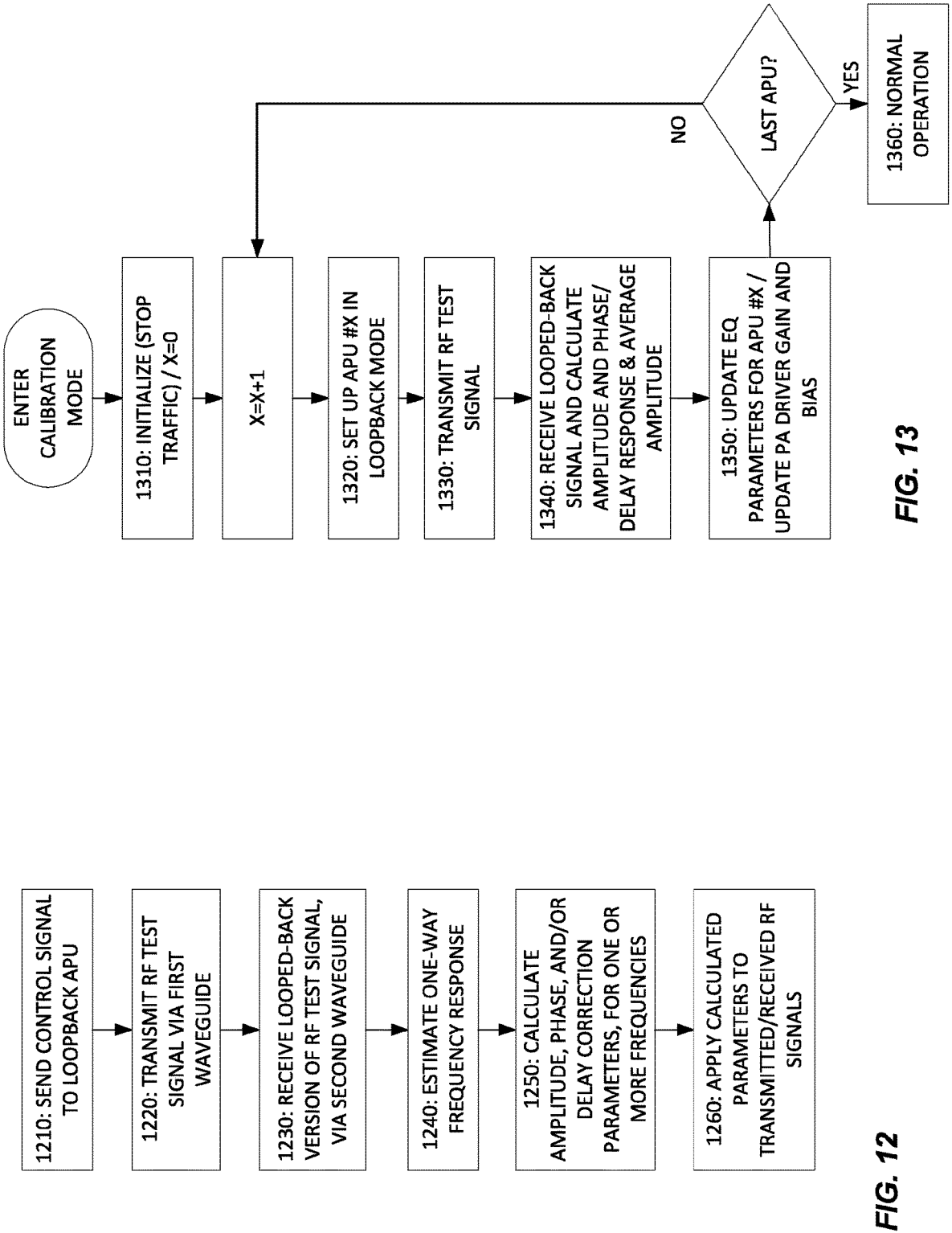

DIELECTRIC WAVEGUIDE SIGNAL TRANSFER FUNCTION COMPENSATION

TECHNICAL FIELD

The present disclosure generally relates to wireless systems in which a central processing unit for a base station is coupled to one or to a series of transmitting and receiving antenna points via dielectric waveguides that carry radiofrequency (RF) signals to and from the antenna points. The present disclosure more particularly relates to techniques for calibrating such systems so that frequency responses of such dielectric waveguides can be compensated.

BACKGROUND

The term "cell-free massive MIMO" [Ref. 1] has been used to refer to a massive Multiple-Input Multiple-Output (MIMO) system where some or all of the transmitting and receiving antennas for a base station are geographically distributed, apart from the base station. Each of the transmitting and receiving points may be referred to as an "antenna point" or "antenna processing unit," with the abbreviation "APU" being used herein.

FIG. 1 provides a conceptual view of a cell-free massive MIMO deployment. As seen in the figure, each of several user equipments (UEs), such as the UE labeled UE 1, has an associated bubble of coverage, representing the area around the UE from which the UE can be reached by transmissions from an APU. Each UE may be surrounded by one or several serving APUs, all of which may be attached to the same central processing unit (CPU), which is responsible for processing the data received from and transmitted by each APU. The UE thus experiences no cell boundaries.

FIG. 2 provides another view of an example deployment. In this scenario, multiple APUs are deployed around the perimeter of a room, which might be a manufacturing floor or a conference room, for example. Each APU is connected to the CPU via a "strip," or "stripe." More particularly, the CPU is connected to two such stripes, each stripe comprising a serial concatenation of several (10, in the illustrated example) APUs. As a general matter, the CPU can target a UE anywhere in the room by controlling one or several APUS that are closest to the UE to transmit signals to and receive signals from the UE.

It will be appreciated that the distribution of base station antennas into APUs as shown in FIGS. 1 and 2 can provide for shorter distances between the UE antenna and the base station antennas, in many scenarios. This will be an enabler for the use of higher carrier frequencies, and thereby higher modulation/information bandwidths, both of which are key expectations for 5G networks.

SUMMARY

One approach to linking a CPU to APUs in a distributed transmission like those described generally above is to interconnect the CPU and APUs using dielectric waveguides that carry information to be transmitted to and received from user equipments (UEs) via radio-frequency (RF) signals, rather than digital signals. A key advantage of linking APUs with CPUs using dielectric waveguides is that a signal to be transmitted by a given APU can be conveyed as an already modulated RF carrier signal from the CPU to the APU, via one or more dielectric waveguides linking the CPU to the APU of interest. This means that no upconversion is needed at the APU—the APU need only route the RF signal to the appropriate antenna or antennas, while providing appropriate amplification and, in some cases, performing analog beamforming. Similarly, an RF signal received by an APU from a UE need not be downconverted at the APU. Instead, it can be amplified and then sent to the CPU in RF form, via one or more dielectric waveguides linking the APU to the CPU.

According to the techniques disclosed herein, the amplitude and phase/delay response of the dielectric waveguides, which is frequency dependent, is measured using an RF test signal that is transmitted by the CPU through at least a first dielectric waveguide connecting the CPU to the first APU in a stripe and then looped back from the first APU or a subsequent APU to the CPU, via a second dielectric waveguide connecting the CPU to the first APU in the stripe.

In some embodiments, this looping back at the APU may be performed by looping the RF test signal from one dielectric waveguide in the APU to another over the air, utilizing multiple antennas in the APU. In some of these embodiments, the RF test signal may be received by the APU via a first dielectric waveguide interface and then transmitted by the APU using an antenna (or antennas) of a first polarization. The same APU in these embodiments may then receive the RF test signal using an antenna (or antennas) of a second polarization, and then send the received RF test signal back towards the CPU via a second dielectric waveguide interface.

Embodiments detailed below include an example method of determining calibration parameters to correct for frequency responses of one or more dielectric waveguides coupling a control unit to a first antenna node or to a series of antenna nodes including the first antenna node. This example method, which may be performed in a CPU, comprises transmitting, via a first dielectric waveguide coupling the control unit to the first antenna node, a radiofrequency (RF) test signal having a signal bandwidth covering a bandwidth of interest. The method further comprises receiving, via a second dielectric waveguide coupling the control unit to the first antenna node, a looped-back version of the transmitted RF test signal. The method still further includes estimating a first one-way frequency response corresponding to the first (or second) dielectric waveguide, based on the RF test signal and the received loop-back version of the transmitted RF test signal.

Other embodiments detailed below include an example method carried out by a first antenna node coupled to an upstream antenna node or to a control unit via first and second dielectric waveguides and coupled to a downstream antenna node via third and fourth dielectric waveguides. This antenna node comprises (a) first radiofrequency (RF) circuitry and corresponding one or more antennas for selectively transmitting RF signals received via the first dielectric waveguide or receiving RF signals via the one or more antennas and coupling the received RF signals to the first dielectric waveguide, and (b) second RF circuitry and corresponding one or more antennas for selectively transmitting RF signals received via the second dielectric waveguide or receiving RF signals via the one or more antennas and coupling the received RF signals to the second dielectric waveguide. This first antenna node further comprises (c) third RF circuitry for selectively forwarding RF signals received via the first and second dielectric waveguides to the third and fourth dielectric waveguides or forwarding RF signals received via the third and fourth dielectric waveguides to the first and second dielectric waveguides. The example method comprises, in some embodiments, receiving, from the control unit or the upstream antenna node, a signal instructing the first antenna node to loopback an RF test signal, and, in response to the signal, looping back an RF test signal received via the first dielectric waveguide to the second dielectric waveguide.

Other methods, as well as apparatus corresponding to and configured to carry out the methods summarized above and other techniques are described in further detail below.

BRIEF DESCRIPTION OF THE FIGURES

FIG. 12 is a process flow diagram illustrating an example method for calibrating dielectric waveguide paths, as implemented in a CPU.

FIG. 13 is a process flow diagram illustrating another method for calibrating dielectric waveguide paths.

DETAILED DESCRIPTION

There are several possible approaches for implementing the interconnections between the CPU and the APUs that it controls. One approach is to implement the interconnections between the CPUs and the APUs as a high-speed digital interface, e.g., such as a high-speed Ethernet connection. With this approach, information to be transmitted by a given APUs is sent from the CPU to the APU as digital baseband information. This digital baseband information is then up-converted to a radiofrequency (RF) signal in the APU, for transmission over the air. In the other direction, RF signals received from a UE are downconverted in the APU and converted to digital form before being sent over the digital link to the CPU, for further processing.

Figure 2:
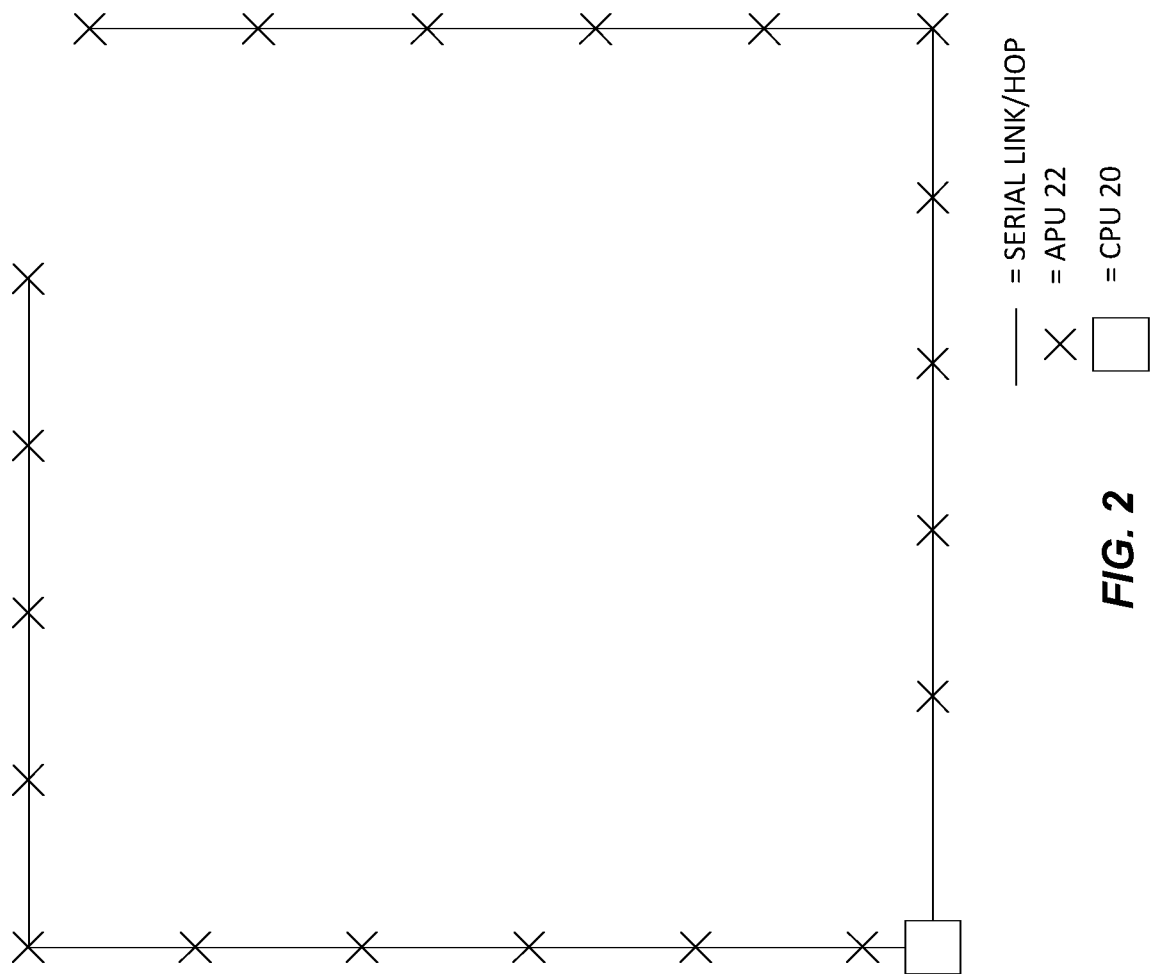
FIG. 2 illustrates an example of a distributed transmission system using serial strips of antenna processing units (APUs), connected to a central processing unit (CPU).
Figure 7:
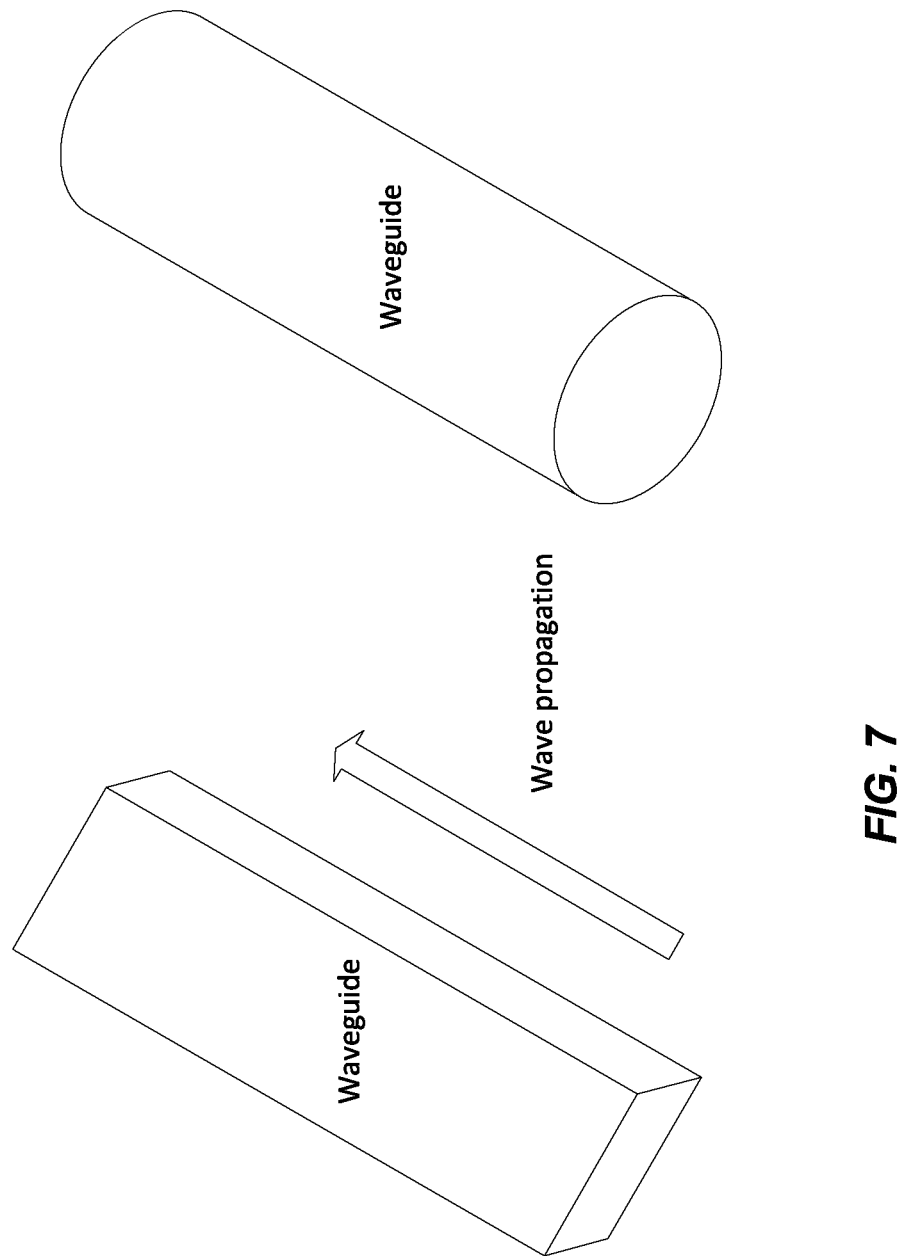
FIG. 7 illustrates examples of dielectric waveguides.

Another approach is to implement each link, or "hop," along the stripes shown in FIG. 2 as a dielectric waveguide that carries a high-frequency RF signal (e.g., a millimeter-wave signal). As a general matter, this term may include any sort of dielectric waveguide, which would include such things as conventional RF waveguides, which are metallic pipes and in which the dielectric substance within the pipe is often simply air. However, more cost-effective solutions have been developed for short- and medium-range applications; these solutions may comprise an inexpensive plastic dielectric that is metallized, e.g., so as to form a "pipe" surrounding the dielectric material or so as to form two parallel plates separated by the dielectric material. These inexpensive dielectric waveguides may provide suitable performance over links that are several meters, or even dozens of meters, long. FIG. 7 illustrates examples of waveguides with rectangular and circular cross sections.

A key advantage of linking APUs with CPUs using dielectric waveguides is that a signal to be transmitted by a given APU can be conveyed as an already modulated RF carrier signal from the CPU to the APU, via one or more dielectric waveguides linking the CPU to the APU of interest. This means that no upconversion is needed at the APU—the APU need only route the RF signal to the appropriate antenna or antennas, while providing appropriate amplification and, in some cases, performing analog beamforming. Similarly, an RF signal received by an APU from a UE need not be downconverted at the APU. Instead, it can be amplified and then sent to the CPU in RF form, via one or more dielectric waveguides linking the APU to the CPU.

In systems utilizing this dielectric waveguide approach, control information, e.g., signals indicating which APU a given RF signal is targeted, indicating beamforming that should be applied to the RF signal when it is transmitted, indicating which APU should send RF signals received for a particular time interval to the CPU, etc., may be sent to the APUs and received from the APUs over a digital channel. This digital channel may be conveyed using any of a variety of physical channel implementations, e.g., by superimposing a digital signal on the conductors of a dielectric waveguide, using any of a wide variety of possible signaling schemes, or by providing a separate electrical link between the CPU and the APUs, for carrying digital control information. It will be appreciated that the information bandwidth of these control signals is far lower than what would be needed to convey digital baseband representations of the signals transmitted and received by the APUs; thus, the physical implementation of the digital links in these dielectric waveguide-based systems can be much simpler than their digital interface-based counterparts.

The techniques described herein are focused on the second approach described above, i.e., on systems where APUs are connected to one another and/or to a CPU via one or more dielectric waveguides.

Figure 3:
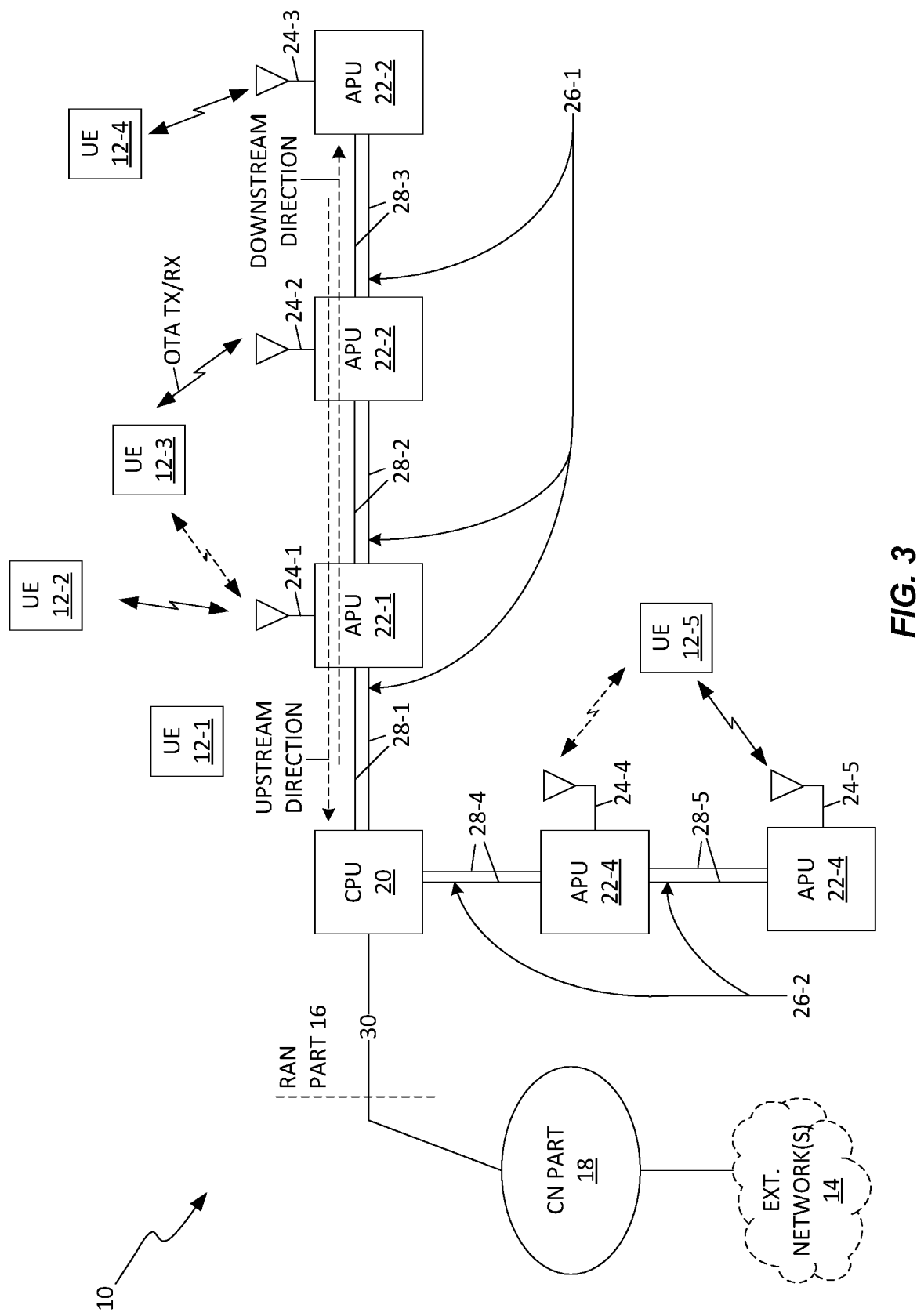
FIG. 3 illustrates an example distributed transmission system forming at least part of a radio access network (RAN), connected to a core network (CN).

FIG. 3 is a block diagram of one embodiment of a wireless communication network 10 ("network 10") that includes a dielectric waveguide-based distributed radio system configured to provide one or more types of communications services to User Equipments (UEs) 12, according to some embodiments of the presently disclosed invention. For example, the network 10 operates as an access network, providing access to one or more external networks (14), such as the Internet.

Figure 1:
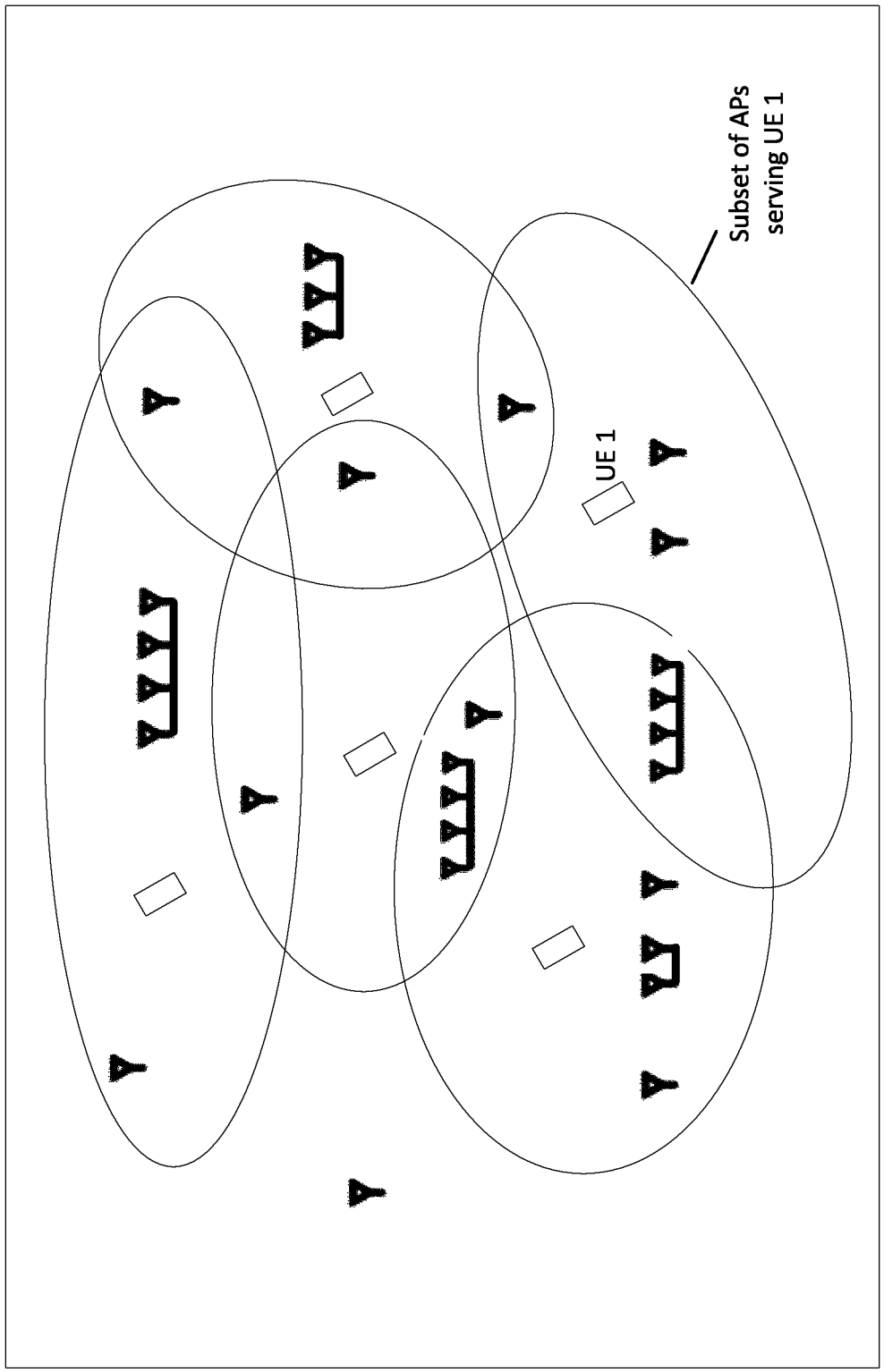
FIG. 1 illustrates an example of a cell-free massive MIMO deployment.

While FIG. 1 depicts five UEs 12-1 through 12-5, no limitation attends the depiction, as the number of UEs 12 connected to the network 10 varies over time. As with the UEs 12, FIG. 3 and other ones of the accompanying figures may depict elements that are the same or at least broadly similar for purposes of discussion using suffixed reference numbers. However, this specification refers to suffixes only when necessary for clarity. Thus, the reference number "12" without suffixing may be used to refer to a given UE in singular form, or to given UEs in plural form. The same holds for other drawing reference numbers depicted with suffixing in any of the figures.

The term "UE" encompasses essentially any type of wireless communication apparatus that is configured to make use of the network 10—i.e., to communicate via wireless attachment to the network 10. Example types or categories of UEs include smartphones, feature phones, laptops, tablets, or other personal computing devices. Other examples include Machine Type Communication (MTC) devices or Internet-of-Things (IoT) devices, such as sensors and controllers. The UEs 12 served by the network 10 may be of the same type or a mix of various types and the mix may change with time. One or more UEs 12 served by the network 10 may be embedded, e.g., in a vehicle, and one or more may be stationary. For example, the network 10 may be an indoor deployment targeting UEs 12 within a building or may be outdoors in an urban area with foot traffic and vehicle traffic.

The network 10 in an example embodiment is configured according to Third Generation Partnership Project (3GPP) specifications. In at least one embodiment, the network 10 is a Fifth Generation (5G) New Radio (NR) network, according to the corresponding 3GPP specifications. See the specifications referred to as 3GPP Release 15 and newer. However, the architecture of the network 10 has wider applicability than 5G NR deployments and 5G NR stands only as one example.

Different "parts" of the network 10 include a Radio Access Network (RAN) part 16, also referred to as the RAN 16, and a Core Network (CN) part 18, also referred to as the CN 18. While not necessarily germane to radio operations of interest herein, the CN 18 provides authentication, mobility-management, and external-network interfacing functions, in support of providing communication services to the UEs 12, while the RAN 16 provides the air interface(s) by which the UEs 12 are "connected" to the network 10.

Example details for the RAN 16 includes a central processing unit (CPU) 20 and one or more antenna processing units (APUs) 22, e.g., APUs 22-1 through 22-5. A characteristic arrangement contemplated herein is that a CPU 20 and one or more APUs 22 form a "chain" 26 of serially interconnected or interlinked entities. In FIG. 1, the CPU 20 anchors two distinct chains, a first chain 26-1 that includes the APUs 22-1, 22-2, and 22-3 in series, and a second chain 26-2 that includes the APUs 22-4 and 22-5 in series. Another CPU might anchor only a single chain, or more than two chains.

The entities constituting each chain 26 are interconnected via dielectric waveguide (DWG) links 28. For example, for the chain 26-1, the CPU 20 couples to the APU 22-1 via a first DWG link 28-1, the APU 22-1 couples to the APU 22-2 via a second DWG link 28-2, and the APU 22-2 couples to the APU 22-3 via a third DWG link 28-3. For the chain 26-2, the CPU 20 couples to the APU 22-4 via a first DWG link 28-4, and the APU 22-4 couples to the APU 22-5 via a second DWG link 28-5.

Each chain 26 has a directional sense, with the direction going away from the CPU 20 being referred to as the "downstream" direction, and with the direction going towards the CPU 20 being referred to as the "upstream" direction. Using this nomenclature, the CPU 20 generates "outbound" radio carrier signals and propagates them into the chain 26 in the downstream direction, for over-the-air (OTA) transmission by one or more of the APUs 22 in the chain 26. Conversely, radio carrier signals received via OTA reception by given ones of the APUs 22 are propagated in the chain 26 in the upstream direction, for conveyance to the CPU 20 for processing—e.g., down-conversion and demodulation.

Saying that a radio carrier signal is "propagated" in the chain 26 refers to DWG-conveyance of the radio carrier signal over one or more successive "hops" or "links" in the chain 26. Each DWG link 28 in the chain constitutes one serial hop or link. Radio carrier signals propagated in the chain 26 may also be referred to as "guided" radio carrier signals or "distributed" radio carrier signals to emphasize that they are conveyed via DWGs. With this in mind, one way to understand operation of the chain 26 is that the CPU 20 generates outbound radio carrier signals, which are then propagated downstream in the chain 26, as far as needed, for OTA transmission by one or more of the APUs 22 in the chain 26. In the opposite direction, radio carrier signals received by given APUs 22 via OTA reception are propagated upstream in the chain 26 to the CPU 20.

Consider an example case where the APU 22-1 in the chain 26-1 operates as a serving base station for the UE 12-1 and the CPU 20 generates a radio carrier signal conveying user traffic for the UE 12-1. The CPU 20 has a DWG interface that couples it to one end of the DWG link 28-1 and it uses that interface to propagate the generated radio carrier signal into the DWG link 28-1 as an outbound radio carrier signal targeting the UE 12-1. In turn, the APU 22-1 includes an "upstream" DWG interface that couples it to the other end of the DWG 28-1, and it receives the outbound radio carrier signal via its upstream DWG interface. Because the outbound radio carrier signal targets a UE 12 that is served by the APU 22-1, the APU 22-1 performs an OTA transmission of the radio outbound carrier signal.

Consider a similar example, but where the outbound radio carrier signal targets the UE 12-4, which is served by the APU 22-3. In this case, the APU 22-1 propagates the outbound radio carrier signal to the next hop in the chain 26-1, which is the DWG link 28-2 that couples the APU 22-1 to the APU 22-2. In turn, the APU 22-2 propagates the outbound radio carrier signal to the next hop in the chain 26-1, which is the DWG link 28-3 that couples the APU 22-2 to the APU 22-3.

Now consider the inbound case, where and given APU 22 within a chain 26 receives an OTA transmission from a UE 12 that it serves. That is, the given APU 22 receives an uplink radio carrier signal from the UE 12. The given APU 22 couples the received uplink radio carrier signal into the DWG link 28 on its upstream side—facing the CPU 20—for propagation in the chain 26 in the upstream direction as an inbound radio carrier signal for the CPU 20. Any intervening APUs 22 in the upstream direction between the given APU 22 and the CPU 20 perform respective next-hop propagations of the inbound radio carrier signal towards the CPU 20.

As such, each APU 22 can transmit and receive via its DWG interfaces, for propagation of radio carrier signals within the chain 26—i.e., waveguide conveyance in the downstream or upstream direction of the chain 26. Further, each APU 22 includes or is associated with an antenna array 24, for OTA transmission of radio carrier signals, referred to as downlink (DL) transmission, and OTA reception of radio carrier signals, referred to as uplink (UL) reception.

All APU operations may be managed and controlled by the CPU 20, e.g. by the CPU 20 distributing control signaling in the chain 26 for the included APUs 22. In one or more embodiments, each APU 22 operates in TDD fashion, such that it performs OTA reception mutually exclusive from OTA transmission and, with respect to one DWG to which it is coupled, it performs DWG reception mutually exclusive from DWG transmission.

Each DWG link 28 comprises at least one DWG—that is, the term "DWG link" as used herein refers to at least one dielectric waveguide. In at least one embodiment, each DWG link 28 comprises a parallel pair of DWGs, with each DWG in the parallel pair being dedicated to a different radio-carrier-signal polarization. Relating this example arrangement to FIG. 1, the DWG link 28-1 is an upstream link with respect to the APU 22-1 and it includes a parallel pair of DWGs, and the DWG link 28-2 is a downstream link with respect to the APU 22-1 and it includes a parallel pair of DWGs. Of course, with respect to the APU 22-2, the DWG link 28-2 is an upstream link and the DWG link 28-3 is a downstream link for the APU 22-2.

Using two or more parallel DWGs in each DWG link 28 allows separate radio carrier signals to propagate simultaneously over the DWG link 28, e.g., for different polarizations and/or greater signal capacity in the chain 26. For example, in FIG. 3, consider the case where each DWG link 28 in the chain 26-1 includes a single DWG for each polarization that is in use. That means that one series set of DWGs is available in the entire chain 26-1 for use in transmitting or receiving radio carrier signals of the involved polarization, at least in a TDD implementation.

In at least one arrangement, the DWG links 28 within a chain 26 comprise 2×N parallel DWGs, where the APUs 22 in the chain 26 are interleaved and every N:th APU 22 is connected to the same DWG pair. Also, such arrangements would gain a capacity increase and increased robustness by terminating the chain 26 with a CPU 20 at each end. For example, one of the terminating CPUs 20 could take over for the other one, if needed, using the same set of series-connected DWGs, or the DWG links 28 in the chain 26 could have respective sets of series-connected DWGs for each of the CPUs 20, such that one of the CPUs 20 acts as a master CPU on one of the sets of series-connected DWGs while the other CPU 20 acts as a master CPU on the other one of the sets of series-connected DWGs. Of course, the APUs 22 would be configured to support such operation.

With TDD operation of the CPU 20, APUs 22, and DGW links 28 in one chain 26-1, conveying radio carrier signals in the downlink direction of the chain 26-1 is mutually exclusive from conveying them in the upstream direction. As such, all of the UEs 12 served by the chain 26-1 "share" the radio-carrier-signal bandwidth in time, with only one UE 12 being served at a time. To change this, the chain 26-1 can include more than one DWG in each DWG link 28, for each polarization in use, such that a first series set of DWGs in the chain 26-1 can be used to serve a given UE 12 at a given time instant, while a second series set of DWGs in the chain 26-1 in parallel with the first set can be used to serve another given UE 12 at the same time.

However, whether each of the DWG links 28 that form the series sets of DWGs individually comprise single DWGs or two or more DWGs in parallel, the DWG-based connection arrangement offers distinct advantages. For example, using digital interfaces for the serial interconnections in the chain 26 would raise serious issues with respect to power consumption and complexity of the serial interconnections and the APUs 22, particularly when targeting very high bit rates for the traffic exchanged with the UEs 12 served by the network 10. At a minimum, the use of digital interfaces would require each APU 22 to include corresponding analog-to-digital converters and digital to analog converters.

Further, as noted, the APUs 22 as contemplated herein do not perform any modulation, demodulation, or frequency-shifting, meaning that the radio carrier signals they transmit OTA are the same ones they received from the CPU 20 via downstream propagation in the chain 26, subject, of course, to any transmit beamforming applied by the APU 22.

Similarly, and APU 22 may perform reception beamforming but, besides that, the OTA-received radio carrier signal incoming to the APU 22 is the same carrier radio signal that the APU 22 propagates in the upstream direction as an inbound radio signal for the CPU 20.

As a further advantageous simplification used in one or more embodiments of the APUs 22, the DWG interfaces included in the APUs 22 operate in TDD fashion with respect to each DWG included in a corresponding DWG link 28-1. That is, with respect to a single DWG, the DWG interface transmits and receives on a mutually exclusive basis. This arrangement reduces complexity, e.g., the need for diplexers and other frequency-multiplexing circuitry. And, as noted, the APUs 22 do not perform frequency-conversion or shifting for the radio carrier signals they handle.

As seen in FIG. 3, the distributed radio system consist of several antennas processing units (APU) 22, which are connected to a single central processing unit (CPU) 20, using serial links 28-1, 28-2, 28-3, etc. More particularly, each APU 22 is connected to at least one neighboring APU 22 and/or to CPU 20 via a pair of dielectric waveguides 28 that carries the RF signal. Two dielectric waveguides 28 may be used for each link so that an APU can be provided (or provide) different RF signals for each of two antenna polarizations. Of course, more than two dielectric waveguides may be used to link neighboring units, in some embodiments.

At each end of each dielectric waveguide, the RF signal received from or transmitted into the dielectric waveguide is converted to or from an electrical signal with a dielectric waveguide interface antenna. These antennas, which may in some cases be very simple conductive elements, launch the RF signals into the dielectric waveguides and pickup RF signals from the dielectric waveguides. The length of each dielectric waveguide 28 is set by the deployment scenario and is therefore not a fixed length.

Figure 4:
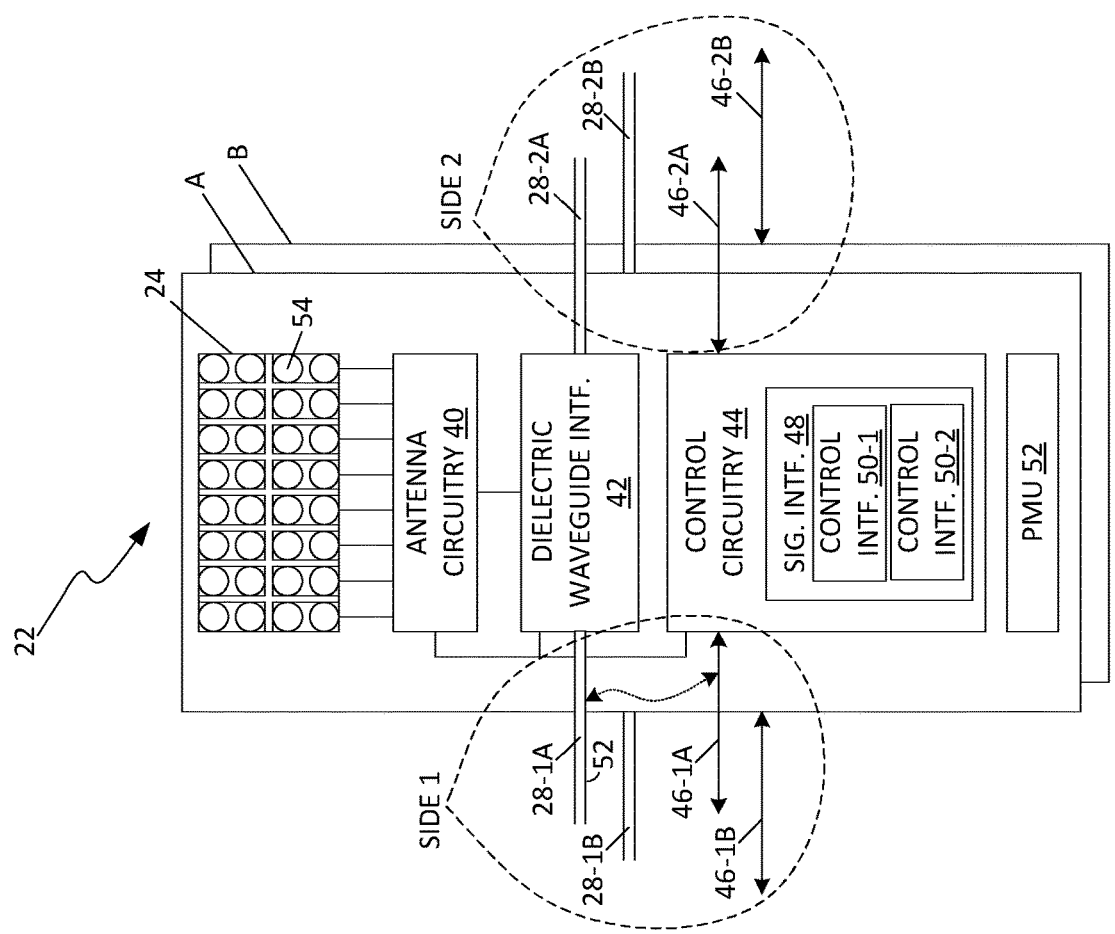
FIG. 4 illustrates an example APU, according to some embodiments.

FIG. 4 depicts an APU 22 in an example embodiment. The APU 22 includes two sides in a functional sense, labeled in the diagram as SIDE 1 and SIDE 2. One is the upstream side facing towards the CPU 20 controlling the chain 26 in which the APU 22 operates and the other side is the downstream side facing away from the CPU 20.

The APU 22 includes "A" elements for a first radio-carrier-signal polarization and "B" elements for a second radio-carrier-signal polarization—e.g., horizontal and vertical polarizations. These may be referred to as "Part A" and "Part B" in the discussion that follows. Correspondingly, the antenna array 24 comprises a small antenna matrix for each polarization. Only the A matrix is visible in the diagram. Each antenna matrix provides beamforming gain and thus improve the link budget between the APU 22 and the UEs 12 that it serves, along with improves the interference situation in implementations where multiple chains 26 use the same radio carrier frequencies. Example matrix dimensions are 6 mm×12 mm for 100 GHz radio carrier signals, with the antenna elements 54 spaced at lambda/2 (1.5 mm).

The example APU 22 further includes antenna circuitry 40 that interfaces with the antenna array 24, a dielectric waveguide interface 42, and control circuitry 44 that may exchange control signaling on the upstream side and on the downstream side of the APU 22. For example, the CPU 20 may output control signaling for the APUs 22 in the chain 26 and each APU 22 in the chain may transfer some or all such signaling onto the next APU 22 in the chain. The signaling may be common to the A and B parts of the APU 22 or may be separate for the A and B parts, e.g., coordinated but separate signaling for A and B radio-carrier-signal polarizations handled by the APU 22. FIG. 4 illustrates such a case, where 46-1A denotes upstream-side control signaling associated with the A part of the APU 22, 46-1B denotes upstream-side control signaling associated with the B part of the APU 22, 46-2A denotes downstream-side control signaling associated with the A part of the APU 22, and 46-2B denotes downstream-side control signaling associated with the B part of the APU 22. Of course, this example not limiting and other control signaling arrangements are contemplated.

In similar AB fashion, the DWG interface 42 of the APU 22 connects to two DWGs in each direction. That is, on SIDE 1 of the APU 22, the DWG interface 42 provides DWG coupling for two DWGs constituting the SIDE-1 DWG link 28-1. These two SIDE-1 DWGs are denoted as 28-1A and 28-1B, corresponding to the A and B parts of the APU 22. Likewise, the DWG interface 42 provides DWG coupling for two DWGs 28 constituting the SIDE-2 DWG link 28-2. These two SIDE-2 DWGs are denoted as 28-2A and 28-2B, corresponding to the A and B parts of the APU 22.

The DWG 28-1A on SIDE 1 "maps" to the DWG 28-2A on SIDE 2, meaning that in relay operation, the APU 22 couples radio carrier signals incoming to the APU 22 from the DWG 28-1A over to the DWG 28-2A, and vice versa. The same cross-side mapping applies for the DWGs 28-1B and 28-2B. In at least one embodiment, the 28-1A/28-2A pairing of DWGs handles a first radio-carrier-signal polarization, such as horizontal polarization, and the 28-1B/20-2B pairing of DWGs handles a second radio-carrier-signal polarization, such as vertical polarization. With TDD operation, only one DWG on either side of the APU 22 is needed per polarization.

Assuming that SIDE 1 is the upstream side of the APU 22, in downlink (DL) operation, also referred to as outbound operation, the DWGs 28-1A and 28-1B carry corresponding outbound radio carrier signals of "A" and "B" polarization, originated from the CPU 20 and propagated in the chain 26 towards the APU 22. If the APU 22 is operating as a relay station, its DWG interface 42 couples these outbound radio signals over to SIDE 2 of the APU 22, into the DWGs 28-2A and 28-2B, for the next APU 22 in the chain 26. Conversely, in base-station or transceiver mode, the DWG interface 42 of the APU 22 couples the outbound radio carrier signals incoming on DWGs 28-1A and 28-1B into the antenna circuitry 40, for OTA transmission from the antenna array 24 (the A and B antenna matrixes in FIG. 3).

Assuming, again, that SIDE 1 is the upstream side of the APU 22, in uplink (UL) operation, also referred to as inbound operation, relay-station operation of the APU 22 involves the APU 22 receiving inbound radio carrier signals on its downstream side (SIDE 2), i.e., on the DWGs 28-2A and 28-2B, where these signals were received via OTA reception by another APU 22 that is downstream in the chain 26. The APU 22 couples these inbound signals into the SIDE-1 DWGs 28-1A and 28-1B, for propagation towards the CPU 20. For base-station mode UL operation, the APU 22 receives an UL radio carrier signal from a UE 12 and couples it into its SIDE 1 DWG interface, for propagation towards the CPU 20 as an inbound radio carrier signal.

Another point worth emphasizing is that the AB segregations shown in FIG. 3 aid discussion, but they are not meant to suggest limitations on how an APU 22 may be implemented with respect to multiple polarizations. At least some aspects may be integrated.

Other example elements illustrated in the APU 22 of FIG. 4 include a signaling interface 48 of the control circuitry 44, which may include two respective control interfaces 50, with the interface 50-1 for control-signaling connectivity on the upstream side of the APU 22 and the interface 50-2 for control-signaling connectivity on the downstream side of the APU 22. For example, the CPU 20 generates control signaling to control the APUs 22 included in a chain 26, such as TDD-related control signaling that determines the relay-station and base-station operations of individual APUs 22 in the chain 26. Such signaling may flow via serial control-signaling links between the CPU 20 and the successive APUs 22 in the chain 26, with the APU 22 closest to the CPU 20 receiving control signaling directly from the CPU 20 and passing all or some of it along to the next APU 22, and so on.

To this end, the control circuitry 44 in one or more embodiments comprises one or more microprocessors, Digital Signal Processors (DSPs), Field Programmable Gate Arrays (FPGAs), or Application Specific Integrated Circuits (ASICs), or any mix thereof. The control circuitry 44 may include or be associated with memory or other computer-readable media, and may operate according to the execution of stored computer program instructions.

In at least one embodiment, the DWGs 28 comprising the DWG links 28 have a conductive exterior 52 that provides an electrical connection for exchanging control signaling between the CPU 20 and the adjacent APU 22, and between adjacent APUs 22. The conductive exterior 52 comprises, for example a metallic coating or a conductive sheathing. In other embodiments, dedicated wired connections independent of the DWG links 28 electrically interconnects the CPU 20 and the APUs 22. In either case, the control signaling includes, for example, TDD control signaling and mode control signaling, according to which the CPU 20 determines which APUs 22 transmit or receive OTA radio carrier signals at what times. Thus, the control signaling provides for operation of the APUs 22 as a distributed antenna system, where the CPU 20 schedules the transmission and/or reception of user traffic from respective UEs 12 served by the chain 26, via respective ones of the APUs 22 in the chain 26.

Each APU 22 may also include or be associated with a power management unit (PMU) 56. The PMU 56 provides operating power for the antenna circuitry 40, the DWG interface 42, and the control circuitry 44, for example. In at least some embodiments, the PMU 56 is controllable by the CPU 20 via the control signaling. In addition to the conductive exteriors 52 of the DWGs in the DWG links 28 carrying the control signaling, the conductive exteriors 52 also may be used to supply operating power, e.g. DC voltage down the chain 26 of APUs 22.

In a Power over Ethernet (POE) example, a 48 VDC power signal is carried via the conductive coatings 52 included in the respective DWG links 28. However, lower operating voltages may be used, e.g., to facilitate full monolithic integration of the circuitry comprising each APU 22. To some extent, the voltage drops incurred on the successive interconnections used to carry the control signaling down the chain 26 of APUs 22 may dictate the voltage level of the DC power signal and the PMU 56 of each APU 22 may include DC/DC converters, as needed, to provide the particular operating voltages needed within the APU 22.

While carrying the control signaling over the power feed may be advantageous in terms of reduced complexity and parts count, the arrangement should be understood as a non-limiting example for the control-signaling interconnections. More broadly, the control signaling arrangement may be implemented as a parallel, low-frequency serial peripheral interface (SPI), with the CPU 20 outputting control signaling for respective ones of the APUs 22 via the SPI.

Each APU 22 has, for example, a unique identifier that allows the CPU 20 to identify which APU 22 is targeted by particular control signaling. Application Specific Integrated Circuits (ASICs) or other integrated circuitry used within each APU 22 may, for example, be fused with a unique identifier that fixes the APU's identity. Dynamic or configurable identities also may be used in one or more embodiments. An APU 22 that receives control signaling not targeted to it would pass it along the next control-signaling hop in the chain 26, in the downstream direction. Likewise, upstream control signaling would pass from APU 22 to APU 22 in the chain 26, as needed, to reach the CPU 20.

As noted, the CPU 20 uses the control signaling to, among other things, control the state of each APU 22 in the chain 26. Here, the possible states may be relay mode, base-station mode, and standby mode, as set under control of the CPU 20.

Figure 5:
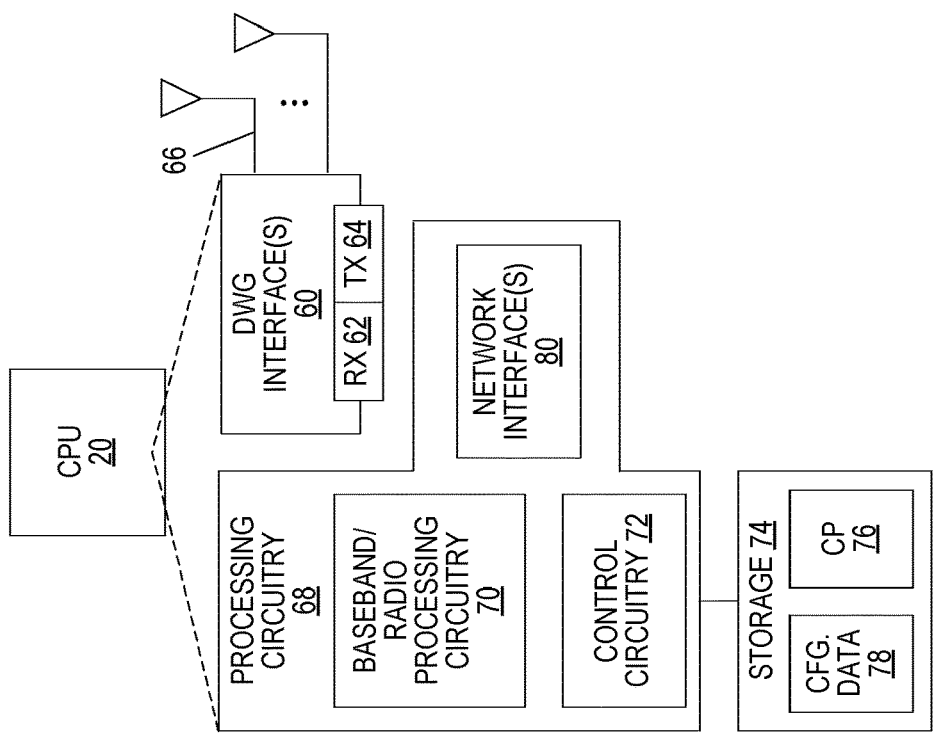
FIG. 5 illustrates an example CPU, according to some embodiments.

FIG. 5 illustrates an example arrangement for the CPU 20 in one or more embodiments. The CPU 20 includes DWG interfaces 60, including receiving and transmitting circuitry 62 and 64, for coupling into the DWGs that comprise its DWG link 28 into the first APU 22 of a chain 26 of APUs 22 controlled by the CPU 20. In at least one embodiment, the DWG interface(s) 60 of the CPU 20 use antennas 66 to transmit outbound radio carrier signals into the associated DWG link 28 and to receive inbound radio carrier signals from the associated DWG link 28. The antennas 66 may be placed for lateral feeding into the associated DWG link 28, and the same arrangement may be implemented in each of the APUs 22, for coupling with their respective upstream and downstream DWG links 28.

The CPU 20 also includes processing circuitry 68, including baseband radio processing circuitry 70 for baseband processing of outbound and inbound signals corresponding to the outbound and inbound radio carrier signals. The CPU 20 further includes control circuitry 72 configured for controlling operation of the CPU 20 and for controlling one or more chains 26 of APUs 22 that are coupled to the CPU 20. To that end, the control circuitry 72 is associated with one or more control-signaling interfaces 74, e.g., SPI circuitry. The control circuitry 72 or the processing circuitry 68 at large also may be associated with one or more network interfaces 84, e.g., that support backhaul connections for carrying user traffic and related network-control signaling between the CPU 20 and one or more supporting nodes in the CN 18.

The processing circuitry 68 in one or more embodiments includes or is associated with storage 76, e.g., for storing configuration data 78 associated with the operation of the CPU 20 and/or one or more computer programs ("CP" in the diagram) comprising computer program instructions the execution of which by one or more microprocessors or other types of digital processors configure such processors as said processing circuitry 68. That is, the processing circuitry 68 may be fixed circuitry or programmed circuitry and, in at least one embodiment, the processing circuitry 68 is at least partly realized by one or more microprocessors being specially adapted according to their execution of computer program instructions stored in the storage 76.

Correspondingly, the storage 76 provides for at least temporary storage of the computer program(s) and also may provide working memory for program execution. Broadly, the storage 76 comprises one or more types of computer-readable media, with non-limiting examples including any one or more of SRAM, DRAM, NVRAM, FLASH, EEPROM, and Solid State Disk (SSD).

The CPU 20 also includes radiofrequency circuitry 82 that is associated with the baseband radio processing circuitry 70 and with the DWG interfaces 60. In cooperation with the baseband radio processing circuitry 70, the CPU 20 uses the radiofrequency circuitry 82 to generate outbound radio carrier signals for output via the DWG interface(s) 60. Likewise, the CPU 20 uses the radiofrequency circuitry 82 to process inbound radio carrier signals received via the DWG interface(s) 60. In this regard, the CPU 20 can be understood as providing all modulation and frequency up-conversion processing for outbound radio carrier signals conveyed in the chain 26 of APUs 22, and providing all demodulation and frequency down-conversion processing for inbound radio carrier signals conveyed in the chain 26 of APUs 22.

Figure 6:
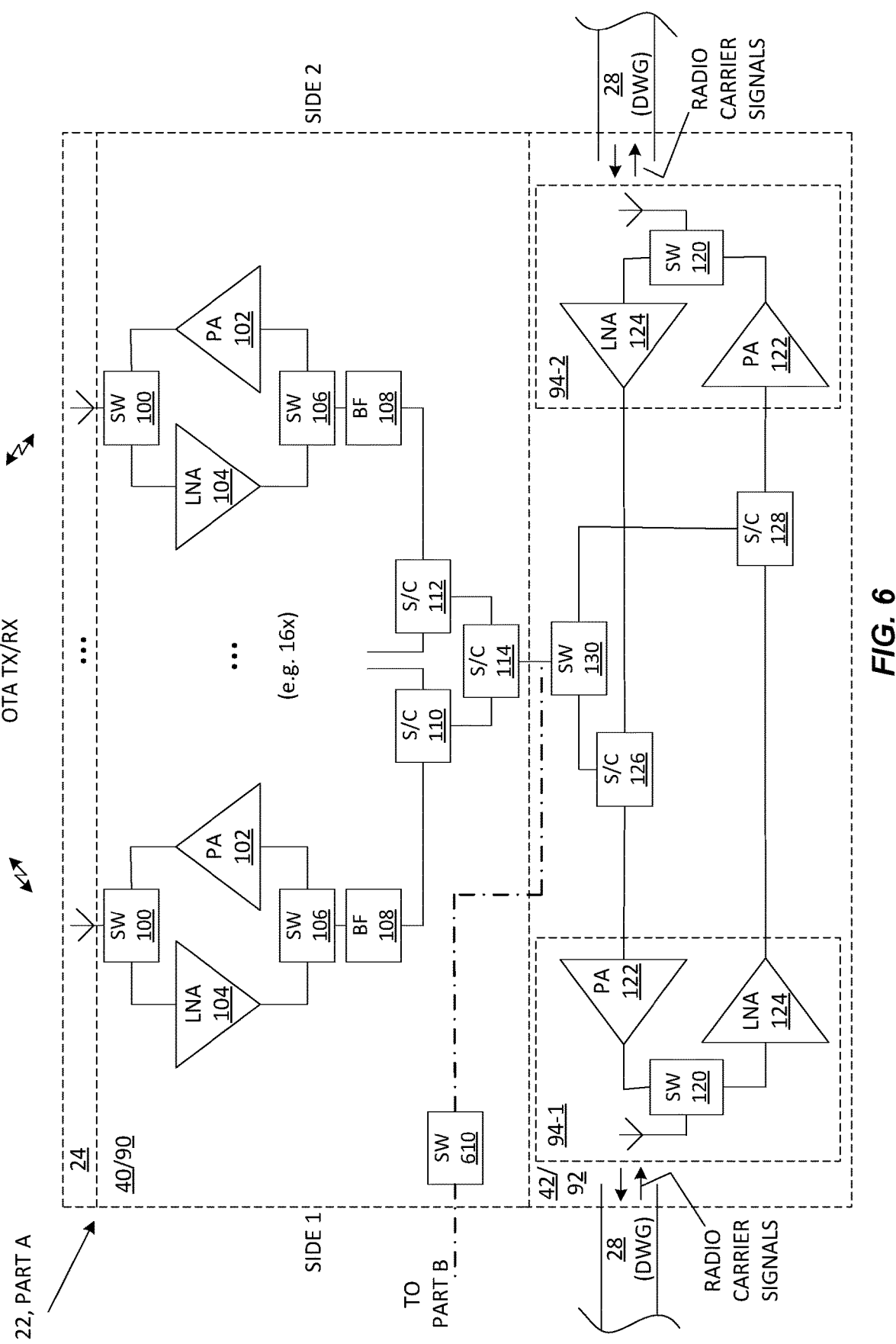
FIG. 6 illustrates further details of an example APU, according to some embodiments.

FIG. 6 is a block diagram illustrating more details of part A of APU 22. Again, it should be understood that example APU 22 comprises a substantially identical part B, which supports a different antenna polarization. FIG. 6 focuses on an example implementation of the DWG interface 42 and the antenna circuitry 40. The antenna circuitry 40 includes first radiofrequency circuitry 90 and the DWG interface 42 includes second radiofrequency circuitry 92.

In an example case, the antenna array 24 includes sixteen antenna elements for transmission and/or reception beamforming, and the first radiofrequency circuitry 90 includes a corresponding block 96 of radiofrequency circuitry per antenna element of the antenna array 24. Each block 96 includes a switch 100, a power amplifier (PA) 102, a low noise amplifier (LNA) 104, a switch 106, a beamforming circuit element 108, and a splitter/combiner (S/C) 110.

The second radiofrequency circuitry 94 comprises respective DWG coupling circuits 94-1 and 94-2. Each DWG coupling circuit 98 provides for transmit/receive coupling via an associated antenna 98 into a DWG 28. To the extent that the APU 22 supports more than one DWG 28 per DWG link 28, it will have a DWG coupling circuit 94 per DWG 28. Going back momentarily to FIG. 3, the depicted APU 22 would include two DWG coupling circuits 94 on SIDE 1, one for the SIDE-1 A connection and one for the SIDE-1 B connection, and two DWG coupling circuits 94 on SIDE 2, one for the SIDE-2 A connection and one for the SIDE-2 B connection.

Further, as seen in FIG. 5, each DWG coupling circuit 94 on one side of the APU 22 is paired with—coupled to—a corresponding DWG coupling circuit 94 on the other side of the APU 22. That is, each DWG coupling circuit 94 on the upstream side of the APU 22 has a corresponding DWG coupling circuit 94 on the downstream side of the APU 22. These complementary pairings, the upstream/downstream pairings, provide for the coupling of radio carrier signals from an upstream DWG 28 into a corresponding downstream DWG 28—i.e., next-hop conveyance. In the diagram, transfer circuitry 99 provides such coupling between the DWG coupling circuit 94-1 and the DWG coupling circuit 94-2.

For relay operation of an outbound radio signal and assuming that SIDE 1 is the upstream side of the APU 22 and that SIDE 2 is the downstream side, an outbound radio carrier signal appears on the DWG 28-1 and the switch 120 of the DWG coupling circuit 94-1 (upstream coupler) is set for receiving, such that the outbound radio carrier signal radiates from the upstream DWG 28-1 and is coupled to the input of the LNA 122 of the upstream coupler. The LNA 122 of the upstream coupler outputs the outbound radio carrier signal with amplification and applies it to an S/C 126 of the transfer circuitry 99. In turn, the S/C 126 applies the outbound radio carrier signal to the input of a PA 122 of the DWG coupling circuit 94-2 (downstream coupler). The PA 122 outputs the outbound radio carrier signal with power amplification, and a switch 120 of the downstream coupler is set for transmission, meaning that the outbound radio carrier signal is launched via the antenna 98 of the downstream coupler into the downstream DWG 28-2.

For relay operation of an inbound radio signal and assuming that SIDE 1 is the upstream side of the APU 22 and that SIDE 2 is the downstream side, an inbound radio carrier signal appears on the DWG 28-2 and the switch 120 of the downstream coupler is set for receiving, such that the inbound radio carrier signal radiates from the downstream DWG 28-2 and is coupled to the input of the LNA 122 of the downstream coupler. The LNA 122 of the downstream coupler outputs the inbound radio carrier signal with amplification and applies it to an S/C 128 of the transfer circuitry 99. In turn, the S/C 128 applies the outbound radio carrier signal to the input of a PA 124 of the upstream coupler. The PA 124 of the upstream coupler outputs the inbound radio carrier signal with power amplification, and the switch 120 of the upstream coupler is set for transmission, meaning that the inbound radio carrier signal is launched via the antenna 98 of the upstream coupler into the upstream DWG 28-1.

For base-station operation with respect to an outbound radio carrier signal received at the APU 22 via the upstream coupler, the S/C 126 of the transfer circuitry 99 applies outbound radio carrier signal to a SW 130 that couples it into an S/C 112 of the antenna circuitry 40. The S/C 112 and S/Cs 110 split/distribute the outbound radio signal into the respective per-antenna blocks 96. In embodiments where the APU 22 performs transmit beamforming, the split radio carrier signal into each of the antenna blocks 96 is weighted by the beamforming element 108 and the switches 106 and 100 are set for transmission, meaning that the split and weighted radio carrier signal passes to the input of the PA 102, for power amplification and OTA transmission from the associated antenna element.

For base-station operation with respect to an OTA radio carrier signal received at the APU 22 via its antenna array 24, the switches 100 and 106 of each antenna block 96 are set for receive, meaning that an antenna-received radio carrier signal appears at the input of the LNA 104 in each block 96, which provides low-noise amplification for the antenna-received radio carrier signal and applies it to the beamforming element 108. In embodiments of the APU 22 that perform receive beamforming, the beamforming element 108 applies a weighting to the radio carrier signal output from the LNA 104 and provides it to a respective one of the S/Cs 110, which combine the radio carrier signals incoming from each of the antenna blocks 96. Correspondingly, the S/C 112 forms a combined radio carrier signal, e.g., a combination of the weighted radio carrier signals output from the respective beamforming elements 108 of the antenna blocks 98 and couples the combined radio carrier signal into the switch 130, which is set for inbound base-station operation and, therefore, couples it into the S/C 128.

In turn, the S/C 128 couples the combined radio carrier signal to the PA 124 of the upstream coupler, which provides power amplification for it and applies it to the switch 120 of the upstream coupler. The switch 120 is configured for transmission, meaning that the combined radio carrier signal from the PA 124 of the upstream coupler is launched into the upstream DWG 28-1, as an inbound radio carrier signal, for propagation in the chain 26 towards the CPU 20.

It will be understood that the selective operation of the SWs 100, 106, 120, and 130, as well as other modally-controlled elements of the first and second radiofrequency circuitry 90 and 92 of the APU 22 are controlled within the APU 22 by the control circuitry 44 of the APU 22, in dependence on the operational state of the APU 22. In turn, the control circuitry 44 of the APU 22 controls the operational state of the APU 22 in dependence on the control signaling targeted to it by the CPU 20. In this respect, the various SWs and S/Cs within the radio frequency circuitry 90 and 92 can be considered as part of the control circuitry 44.

Similarly, the beamforming solutions used by the APU 22 for transmit and/or receive antenna beamforming—i.e., the dynamically configured sets of antenna weights collectively applied by the beamforming elements 108 of the antenna blocks 96—may be determined by the CPU 20 and conveyed to the APU 22 via the control signaling. As such, the control circuitry 44 of the APU 22 includes or interfaces to the beamforming elements 108, to set the per-antenna weights applied to the radio carrier signals incoming from the antenna array 24 or outgoing to the antenna array 24.

As seen in FIG. 5, the same or similar RF-circuit building blocks are used to implement the antenna circuitry 40 and the DWG interface 42. Notably, the elimination of frequency-conversion blocks and mixed-mode circuits from the radio-carrier-signal paths within the APU 22 relaxes the requirements on the integrated-circuit process choices available for implementation of these parts of the APU 22. As a further advantage, the absence of filters from the radio-carrier-signal paths within the APUS 22 enables full monolithic integration of the circuit elements comprising the antenna circuitry 40 and the DWG interface 42.

Some embodiments of an APU 22 may include a loopback switch (SW) 610 that connects parts A and B at the point shown in FIG. 6, i.e., at the point between dielectric waveguide interface circuitry 42 and antenna circuitry 40. This loopback switch 62 provides for a loopback path that connects the dielectric waveguide interface circuitry 42 in the two parts of the APU 22, making it possible to pass an RF signal from a dielectric waveguide 28 connected to part A of APU 22 to a dielectric waveguide 28 connected to part B of APU 22, and vice versa, without passing through any of the antenna circuitry 40 in either part. The significance and usefulness of this will be explained further, below.

One problem with using a dielectric wave guide as interface between the APUs 22 in a system like that illustrated in FIG. 3 is that each of the dielectric waveguides has an amplitude and phase/delay response that is frequency dependent. This means that passing RF signals with a wide bandwidth through each link between a CPU and APU or between two APUs introduces a frequency-dependent attenuation of the RF signal, which increases with increasing length of the dielectric waveguide, and that accumulates for signals that are forwarded through two or more dielectric waveguides. One approach to this problem, as discussed in U.S. Pat. No. 9,960,849 B1 [Ref. 2], is to divide the RF signal into sub-bands that have narrow enough bandwidths that the phase/delay and amplitude ripple is reasonably constant within each sub-band. This technique, however, requires the use of up- and down-conversion circuitry in each of the APUs, which increases the cost and complexity of the APUs. The embodiments described herein provide a more cost-efficient solution to this problem. With these embodiments, the need for up- and down-conversion circuitry in the APUs can be avoided; only the CPU need include up- and down-conversion circuitry.

According to the techniques disclosed herein, the amplitude and phase/delay response of the dielectric waveguides, which is frequency dependent, is measured using an RF test signal that is transmitted by the CPU 20 through at least a first dielectric waveguide 28 connecting the CPU 20 to the first APU 22 in a stripe and then looped back from the first APU 22 or a subsequent APU 22 to the CPU 20, via a second dielectric waveguide 28 connecting the CPU 20 to the first APU in the stripe.

In some embodiments, this looping back at the APU 22 may be performed by looping the RF test signal from one dielectric waveguide in the APU 22 to another over the air, utilizing multiple antennas in the APU 22. As discussed above, an APU 22 may be equipped with dual-polarized antennas. In these embodiments, the RF test signal may be received by the APU 22 via a first dielectric waveguide interface and then transmitted by the APU 22 using an antenna (or antennas) of a first polarization. The same APU 22 in these embodiments may then receive the RF test signal using an antenna (or antennas) of a second polarization, and then send the received RF test signal back towards the CPU 20 via a second dielectric waveguide interface.

Figure 8:
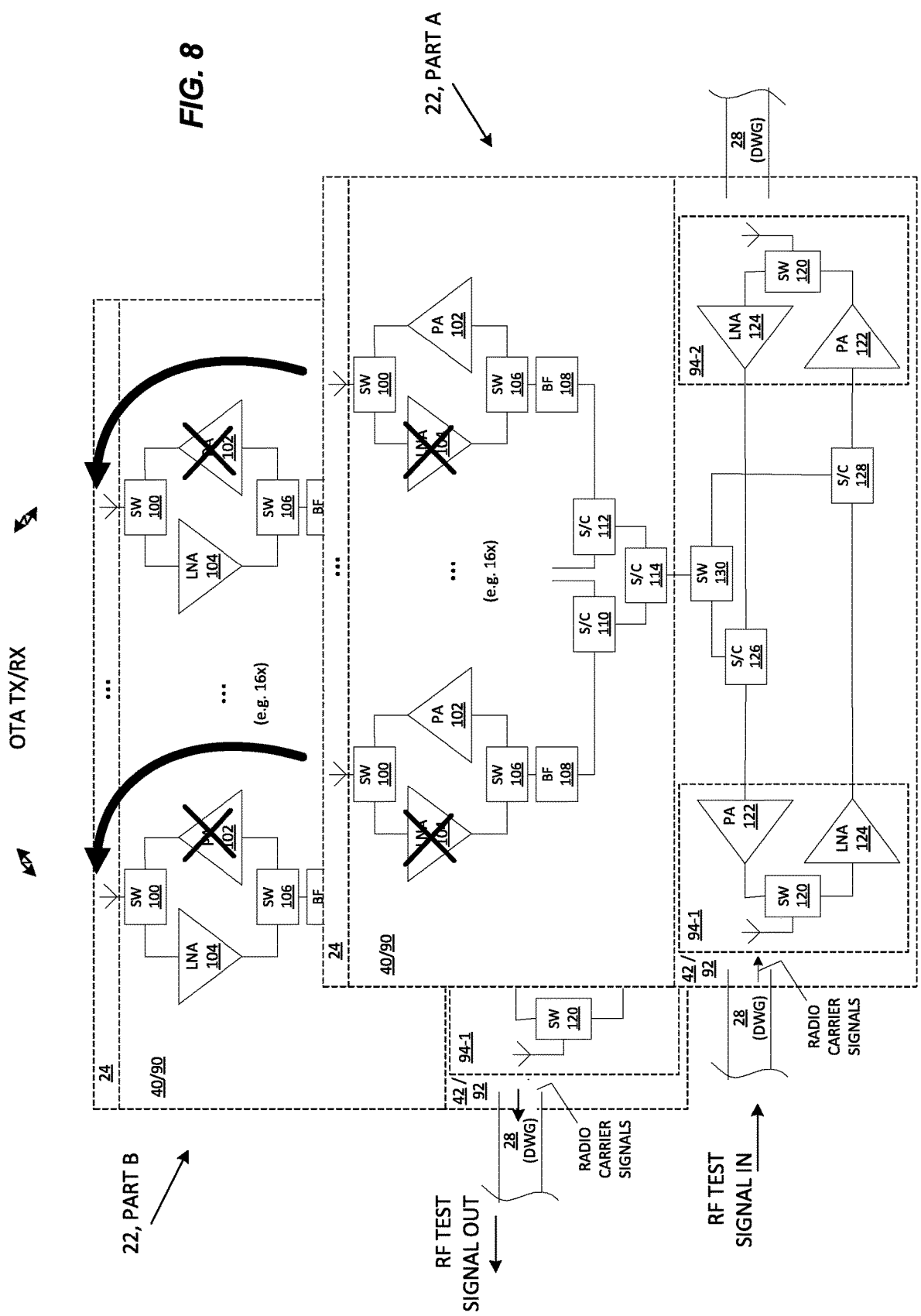
FIG. 8 is a block diagram illustrating one approach to looping back an RF test signal in an APU, according to some embodiments.
Figure 9:
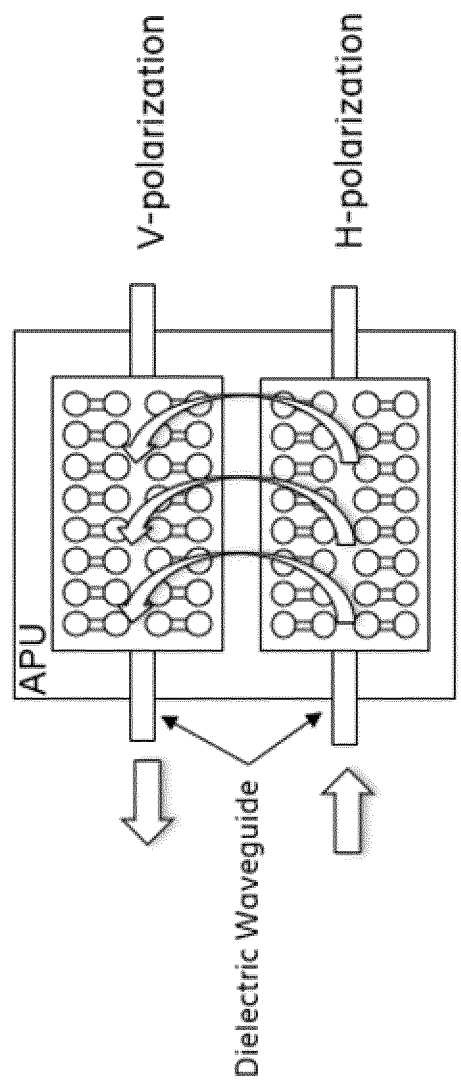
FIG. 9 is a view illustrating how an RF test signal can be looped back using antennas of different polarizations.

This is shown in FIG. 8, which illustrates an example APU 22, comprising parts A and B, with parts A and B having different antenna polarizations. The RF test signal is input to the dielectric waveguide 28 on the left-hand side (CPU-facing side) of APU 22 part A, and is then forwarded by the waveguide interface circuitry 42 of APU 22 part A to the the antenna circuitry 40 of APU 22 part A, where it is transmitted over the air. The transmitted RF test signal is received by antenna circuitry 40 of APU 22 part B, and forwarded to the dielectric waveguide interface circuitry 42 of APU 22 part B, which then transmits it back towards the CPU, via the dielectric waveguide 28 on the left-hand (CPU-facing) side of APU 22 part B. A simplified view of this loopback path is shown in FIG. 9, which shows the RF test signal being looped back through the horizontal-polarization side of APU 22 to the vertical-polarization side, and then sent back towards the CPU.

An alternative to transmitting the RF test signal over the air is to provide APU 22 with a dedicated loopback switch 610, as shown in FIG. 6. With this approach, the antenna circuitry 40 in both APU 22 part A and B is not used. Rather, the RF test signal is input to the dielectric waveguide 28 on the left-hand side (CPU-facing side) of APU 22 part A, and is then forwarded by the waveguide interface circuitry 42 of APU 22 part A directly to the waveguide interface circuitry 42 of APU 22 part B, using loopback switch 610. The dielectric waveguide interface circuitry 42 of APU 22 part B then transmits it back towards the CPU, via the dielectric waveguide 28 on the left-hand (CPU-facing) side of APU 22 part B.

The RF test signal has a bandwidth comparable to the RF signals that will be transmitted to and received from UEs served by the APUs 22, so that the amplitude, phase, and delay response of the dielectric waveguides 28 can be estimated by the CPU 20 across the same frequency bandwidth utilized by UE RF signals, or at several discrete frequencies spanning this bandwidth.

The total phase/delay and amplitude response can then be estimated for the loop that comprises the two parallel wave guides—this phase/delay and amplitude response may be represented in the frequency domain as Hloop(s). The phase/amplitude response from the antenna coupling or switch can be characterized separately and removed from the response to derive a frequency response Hloop(s) that corresponds to the response of only the dielectric waveguides in the loop.

The phase/delay and amplitude response HWG(s) for a single direction (outbound to the APU, or inbound from the APU to the CPU) is estimated by splitting the frequency response into two equal parts, based on the assumption that the two dielectric waveguides for a given link/hop have the same frequency response. This is a reasonable assumption in many cases, e.g., for dielectric waveguide pairs that are manufactured together, as a single component. This splitting of the two-way frequency response into a one-way frequency response HWG(s) is a simple operation when it is done in the frequency domain:

$$H\mathrm{loop}(s) = HWG(s) * HWG(s) = [HWG(s)]^2;$$

$$HWG(s) = [H\mathrm{loop}(s)]^{0.5}$$

The calibration technique described above can be done separately for each APU in a series of APUs. When it is performed for an APU that is beyond the first APU in the series, i.e., the APU closest to the CPU, the APUs between the CPU and the APU that is looping back the RF test signal are instructed, via control signaling from the CPU, to forward the RF test signal towards the loopback APU and to forward the looped-back RF test signal back towards the CPU.

The one-way frequency response for each APU so obtained can be used to determine compensation parameters, e.g., amplitude, phase, and/or delay compensation parameters, to correct for the frequency-dependent frequency response of the one-way path through the dielectric waveguides to a particular APU. The CPU may derive a frequency-dependent compensation function, in some embodiments, or a set of compensation parameters corresponding to several frequencies across the RF bandwidth of the RF test signal. These compensation functions or parameters are stored in the CPU. In operation mode, RF signals transmitted to or received from a given APU can then be equalized, using the corresponding compensation parameters or function, to remove the amplitude and delay effects from the dielectric wave guide.

Figure 10:
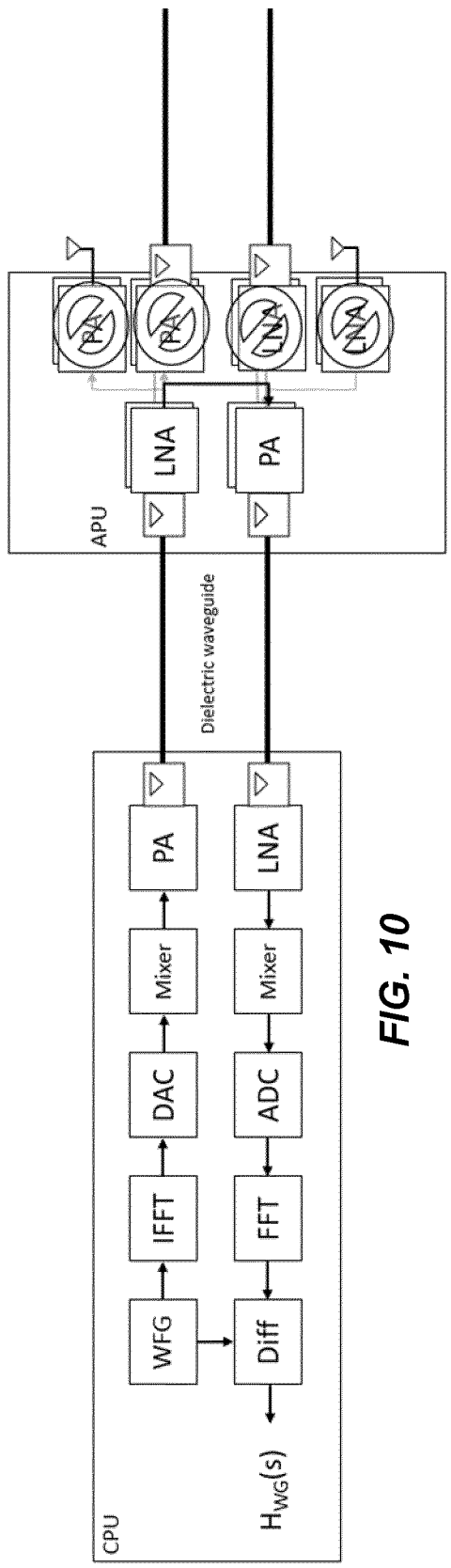
FIG. 10 illustrates looping back of an RF test signal via a switch in an APU.

FIG. 10 is a block diagram illustrating functional elements of CPU 20, as may be used during the calibration and compensation operations described above. A waveform defined in the frequency domain, by the waveform generator (WFG) block, is converted to time domain with an IFFT. After conversion to analog via a digital-to-analog converter (DAC), the signal is up-converted, using a mixer, amplified with a power amplifier (PA), and transmitted over the waveguide to the APU. The RF test signal sent via the dielectric waveguide is looped back, in the illustrated case using the loopback switch between the dielectric waveguide interface circuits in the APU. The APU transmits the looped-back RF test signal over the dielectric waveguide to the CPU, where the signal, after amplification by a low-noise amplifier (LNA), is downconverted with a mixer and digitized with an analog-to-digital converter (ADC). After conversion to the frequency domain, with an FFT, the baseband waveform obtained from the looped-back RF test signal can be compared to the waveform used to generate the originally transmitted RF test signal, using the "Diff" block shown in the figure. This "diff" block may comprise digital signal processing circuitry, in various embodiments.

FIG. 10 illustrates the setup when the first APU in a series of APUs is calibrated. For other APUs, the same principles apply, but all APUs between the CPU and the APU being calibrated will be set to repeat mode, so that the RF test signal is forwarded to the APU being calibrated and back again. The signal is repeated in the direction from CPU in one polarization and in the other polarization towards the CPU.

Figure 11:
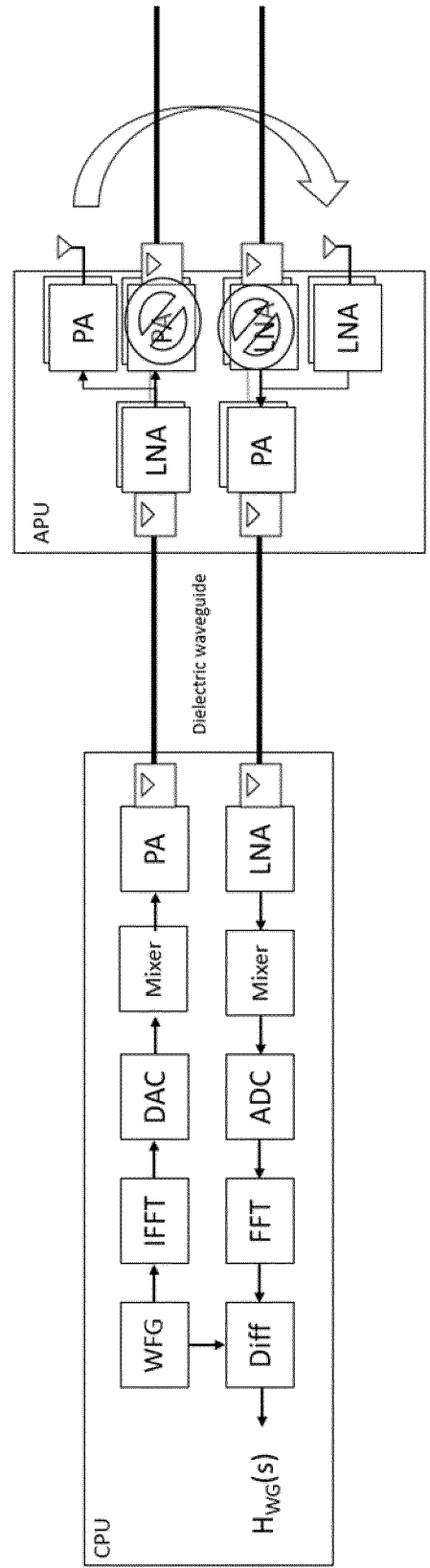
FIG. 11 illustrates looping back of an RF test signal via antennas in an APU.

FIG. 11 illustrates essentially the same setup shown in FIG. 10, except that the looping back of the RF test signal is performed over the air, as was described above in connection with FIGS. 8 and 9. The signal processing and control operations performed by the CPU are the same as discussed above.

In the description above, it has been described that the antenna in the APU is dual polarized. The techniques will also work if two antennas with same polarization are used. The use of dual-polarized antennas, however, will provide higher isolation between the two antennas in the APU, which will increase the likelihood for that the looped back signal will not compress the receiving LNA. Additionally, the description above assumes that each APU uses two dielectric waveguides in each direction of the stick/strip, one for each polarization. The techniques may also be used, of course, in implementations in which three or more dielectric waveguides are used in each direction.

FIG. 12 illustrates an example method of determining calibration parameters to correct for frequency responses of one or more dielectric waveguides coupling a control unit to a first antenna node or to a series of antenna nodes including the first antenna node. The illustrated method, which may be performed in a CPU, begins with transmitting, via a first dielectric waveguide coupling the control unit to the first antenna node, a radiofrequency (RF) test signal having a signal bandwidth covering a bandwidth of interest. This is shown at block 1220. The method further comprises receiving, via a second dielectric waveguide coupling the control unit to the first antenna node, a looped-back version of the transmitted RF test signal, as shown at block 1230. As shown at block 1240, the method further includes estimating a first one-way frequency response corresponding to the first (or second) dielectric waveguide, based on the RF test signal and the received loop-back version of the transmitted RF test signal.

In some embodiments or instances, this first one-way frequency response corresponding to the first dielectric waveguide represents an estimated frequency response for the first dielectric waveguide alone, i.e., when the RF test signal is looped back from the APU closest to the CPU in a serial chain of multiple APUs. The method may comprise sending a a control signal to this first antenna node, prior to transmitting the RF test signal, the control signal instructing the first antenna node to loop back the RF test signal. This is shown at block 1210.

In some embodiments, determining the first one-way frequency response corresponding to the first dielectric waveguide comprises determining a two-way frequency response based on the RF test signal and the received loop-back version of the transmitted RF test signal, adjusting the two-way frequency response to account for an estimated frequency response of a loop-back path in the first antenna node, and calculating the first one-way frequency response from the adjusted two-way frequency response based on an assumption that frequency responses corresponding to the first and second dielectric waveguides are equal. Mathematical details corresponding to this approach were provided in the detailed discussion above. In some of these embodiments, the estimated frequency response of the loop-back path in the first antenna node accounts for over-the-air coupling between at least a first antenna in the first antenna node, from which the RF test signal is transmitted over the air, and at least a second antenna in the first antenna node, at which the RF test signal is received after transmission over the air. These antennas may have first and second polarizations, respectively, the first and second polarizations being at least approximately orthogonal. In other embodiments, the estimated frequency response of the loop-back path in the first antenna node accounts for an estimated frequency response of a switched path coupling the first dielectric waveguide to the second dielectric waveguide, through the first antenna node.

In some embodiments, the method further comprises calculating an amplitude correction parameter and/or a phase correction parameter for each of two or more frequencies or frequency ranges within the bandwidth of interest, based on the first one-way frequency response. This is shown at block 1250 of FIG. 12. These parameters can be referred to as equalization, or "EQ," parameters. The method may further comprise, as shown at block 1260, applying the calculated amplitude correction parameters and/or phase correction parameters to RF signals subsequently sent to the first antenna node, via the first and/or second dielectric waveguide, for transmission by the first antenna node, and/or applying the calculated amplitude correction parameters and/or phase correction parameters to RF signals received from the first antenna node, via the first and/or second dielectric waveguide.

It was noted above that some embodiments or instances of the method illustrated in FIG. 12 may obtain a first one-way frequency response that corresponds to the first dielectric waveguide alone, i.e., to only the dielectric waveguide connecting the CPU to the closest APU. In other embodiments or instances, the APU looping back the RF test signal may be any of one or more APUs beyond that first APU in the serial chain. In these embodiments or instances, the first one-way frequency response corresponding to the first dielectric waveguide may instead represent an estimated frequency response for a series of two or more dielectric waveguides, the series comprising the first dielectric waveguide and one more additional waveguides between the first antenna node and each of one or more additional antenna nodes coupled in series with first antenna node, via respective ones of the one or more additional waveguides. Again, the method further comprises sending a control signal to this additional node at the end of said series, prior to transmitting the RF test signal, the control signal instructing the additional node at the end of said series to loop back the RF test signal.

As with the previously discussed embodiments, in those embodiments in which the RF test signal is being looped back from the additional antenna node (rather than the first antenna node in the series), estimating the first one-way frequency response corresponding to the first dielectric waveguide may comprise determining a two-way frequency response based on the RF test signal and the received loop-back version of the transmitted RF test signal, adjusting the two-way frequency response to account for a frequency response of a loop-back path in the additional antenna node from which the transmitted RF test signal is looped back, and calculating the first one-way frequency response from the adjusted two-way frequency response based on an assumption that frequency responses corresponding to the first and second dielectric waveguides are equal. Once again, the estimated frequency response of the loop-back path in the additional antenna node may account for over-the-air coupling between at least a first antenna in the additional antenna node, from which the RF test signal is transmitted over the air, and at least a second antenna in the additional antenna node, at which the RF test signal is received after transmission over the air, or may account for an estimated frequency response of a switched loopback path through the additional node.

As with the previously discussed examples, the method in these further embodiments may further comprise calculating an amplitude correction parameter and/or a phase correction parameters for each of two or more frequencies or frequency ranges within the bandwidth of interest, based on the first one-way frequency response, and applying the calculated amplitude correction parameters and/or phase correction parameters to RF signals subsequently sent to the additional antenna node from which the transmitted RF test signal is looped back, via the first and/or second dielectric waveguide, for transmission by the additional antenna node from which the transmitted RF test signal is looped back, and/or applying the calculated amplitude correction parameters and/or phase correction parameters to RF signals received from the additional antenna node from which the transmitted RF test signal is looped back, via the first and/or second dielectric waveguide.

In some embodiments, the steps shown in FIG. 12 may correspond to a first calibration that produces a first one-way frequency response corresponding to the first dielectric waveguide that represents an estimated frequency response for the first dielectric waveguide alone. As suggested above, the technique may be repeated for further nodes in the chain. In some of these embodiments, then, some or all of the steps of FIG. 12 are repeated. Thus, for example, the method may comprise re-transmitting the RF test signal via the first dielectric waveguide coupling the control unit to the first antenna node, i.e., repeating the step shown at block 1220 of FIG. 12, and receiving, via the second dielectric waveguide coupling the control unit to the first antenna node, a looped-back version of the retransmitted RF test signal, i.e., repeating the step shown at block 1230 of FIG. 12. In this case, however, the looped-back version is looped back from a further antenna node in the chain. Thus, when the step shown in block 1240 is repeated, this amounts to estimating a second one-way frequency response corresponding to the first (or second) dielectric waveguide, based on the retransmitted RF test signal and the received loop-back version of the retransmitted RF test signal, the second one-way frequency response representing a frequency response for a series of two or more dielectric waveguides, the series comprising the first dielectric waveguide or the second dielectric waveguide and one more additional waveguides between the first antenna node and each of one or more additional antenna nodes coupled in series with first antenna node, via respective ones of the one or more additional waveguides.

FIG. 13 is a process flow diagram providing another illustration of an example method carried out by a CPU, according to some of the techniques described herein. The method begins with entering a "calibration mode." This may be done upon system installation, for example, prior to use of the distributed transmission system, or may be carried out periodically or on demand, to ensure that the system remains well calibrated.

The method begins, as shown at block 1310, with an initialization step. Here, RF traffic to and from the APUs, if any, is halted, and a count variable X is set to zero. Next, the count variable is incremented to 1. As shown at block 1320, APU #X is set into loopback mode, i.e., by sending a control signal or command to the APU. In the first iteration of the loop, APU #X is APU #1, i.e., the closest APU to the CPU in the serial chain of APUs. Of course, a CPU may be connected to more than one serial chain of APUs, in which case the method described here may be repeated for each of these chains.

As shown at block 1330, the CPU then transmits the RF test signal to APU #X, via a first waveguide coupling the CPU to APU #1. For this first iteration, the RF test signal is looped back by APU #1; in subsequent iterations the RF test signal is forwarded by APUs into the chain until it reaches APU #X, where it is looped back.

As shown at block 1340, the CPU receives the looped-back RF test signal via a second waveguide coupling the CPU to APU #1, and calculates frequency-dependent amplitude, phase, and delay responses. These are one-way responses, corresponding to either the outbound path, i.e., the one or more dielectric waveguides linking the CPU to APU #X as the RF test signal propagates to APU #X, or the inbound path, i.e., the one or more dielectric waveguides through which the looped-back RF test signal returns to the CPU. For many installations/applications, it can be reasonably assumed that the outbound and inbound responses are effectively equal; thus, the one-way response can be calculated accordingly.

As shown at block 1350, the calculated frequency-dependent amplitude, phase, and delay responses are used to determine and/or update equalization parameters for use when subsequently sending RF signals to and receiving RF signals from APU #X. These are stored for later use. Similarly, parameters for controlling a power amplifier (PA) driver gain and/or bias, for use when sending RF signals to APU #X, may be calculated. In some cases, these parameters may include parameters sent to APU #X for its use in controlling PA drivers when forwarding RF signals to a next APU or when sending signals towards the CPU.

The steps discussed above are repeated, for each APU in the chain, with each APU successively being instructed to loopback the RF test signal. When the paths for all the APUs have been calibrated, the system may begin (or resume) normal operation, as shown at block 1360.

Figure 14:
FIG. 14 is a process flow diagram illustrating an example method in an APU.

FIG. 14 illustrates an example method carried out by a first antenna node coupled to an upstream antenna node or to a control unit via first and second dielectric waveguides and coupled to a downstream antenna node via third and fourth dielectric waveguides. This antenna node comprises (a) first radiofrequency (RF) circuitry and corresponding one or more antennas for selectively transmitting RF signals received via the first dielectric waveguide or receiving RF signals via the one or more antennas and coupling the received RF signals to the first dielectric waveguide, and (b) second RF circuitry and corresponding one or more antennas for selectively transmitting RF signals received via the second dielectric waveguide or receiving RF signals via the one or more antennas and coupling the received RF signals to the second dielectric waveguide. This first antenna node further comprises (c) third RF circuitry for selectively forwarding RF signals received via the first and second dielectric waveguides to the third and fourth dielectric waveguides or forwarding RF signals received via the third and fourth dielectric waveguides to the first and second dielectric waveguides. The example method comprises receiving, from the control unit or the upstream antenna node, a signal instructing the first antenna node to loopback an RF test signal, as shown at block 1410. The method further comprises, in response to the signal, looping back an RF test signal received via the first dielectric waveguide to the second dielectric waveguide. This is shown at block 1420.

In some embodiments, this looping back of the RF test signal comprises transmitting the RF test signal over the air, using the first RF circuitry and one or antennas corresponding to the first RF circuitry, and receiving the transmitted RF test signal, using the second RF circuitry and one or antennas corresponding to the second circuitry. In other embodiments, this looping back the RF test signal comprises routing the RF test signal from the first dielectric waveguide to the second dielectric waveguide via a loopback switch coupling the first dielectric waveguide to the second dielectric waveguide.

In some embodiments or instances, the method may further comprise receiving, from the control unit or the upstream antenna node, a second signal, the second signal instructing the first antenna node to repeat an RF test signal for a downstream antenna node. This is shown at block 1430 of FIG. 13. In these embodiments or instances, the method further comprises, in response to the second signal, forwarding RF signals received via the first dielectric waveguide to the third dielectric waveguide and forwarding RF signals received via the fourth waveguide to the second dielectric waveguide. It will be appreciated that this amounts to forwarding outbound RF signals in the outbound direction, i.e., to the next APU in the chain, and forwarding RF signals received from the next APU in the chain in an outbound direction, i.e., towards the CPU.

It will be appreciated that embodiments of the inventive concepts described herein include apparatuses that are adapted to carry out the methods and techniques described above. These apparatuses may take the form of a control node or CPU 20, like that illustrated in FIG. 5, and an antenna node or APU 22, like that illustrated in FIG. 4.

Thus, for example, an example control node 20 for determining calibration parameters to correct for frequency responses of one or more dielectric waveguides coupling the control node to a first antenna node or to a series of antenna nodes including the first antenna node may comprise first and second dielectric waveguide interfaces, each being configured to selectively transmit and receive radiofrequency, RF, signals via a respective dielectric waveguide, to and from a first antenna node. In FIG. 5, these dielectric waveguide interfaces are shown combined as DWG interfaces 60.

Control node 20 in these examples further comprise first RF circuitry operatively coupled to the first dielectric waveguide interface and configured to selectively transmit RF signals via the first dielectric waveguide interface or receive RF signals via the first dielectric waveguide interface, and second RF circuitry operatively coupled to the second dielectric waveguide interface and configured to selectively transmit RF signals via the second dielectric waveguide interface or receive RF signals via the first dielectric waveguide interface. The control node 20 further comprises baseband circuitry and upconversion circuitry configured to generate RF signals from baseband signals. In FIG. 5, the baseband and RF circuitries are shown combined as baseband/radio processing circuitry 70.

Control node 20 further comprises processing circuitry, illustrated as control circuitry 72 in FIG. 5. This processing circuitry is operatively coupled to and configured to control the first and second RF circuitry, baseband circuitry, and upconversion circuitry to carry out one or more of the calibration methods described herein. Thus, the processing circuitry may control the CPU to transmit, via the first dielectric waveguide an RF test signal having a signal bandwidth covering a bandwidth of interest, to receive, via the second dielectric waveguide interface, a looped-back version of the transmitted RF test signal, and to estimate a first one-way frequency response corresponding to the first (or second) dielectric waveguide interface, based on the RF test signal and the received loop-back version of the transmitted RF test signal. The processing circuitry may be further configured to carry out any of the additional steps and/or variant techniques described herein, e.g., as described in connection with FIGS. 12 and 13.

Similarly, embodiments may include an antenna node, or APU, adapted to and/or configured to carry out one or more of the techniques described herein. An example is illustrated in FIG. 4, where APU 22 comprises first and second dielectric waveguide interfaces, each being configured to selectively transmit and RF signals via a respective dielectric waveguide, to and from an upstream antenna node or control unit. In FIG. 4, these first and second dielectric waveguide interfaces are in Part A and Part B, respectively, of the illustrated APU 22, and face to the left (on Side 1); these parts may correspond to first and second antenna polarizations, in some embodiments. APU 22 further comprises third and fourth dielectric waveguide interfaces, each being configured to selectively transmit and receive RF signals via a respective dielectric waveguide, to and from a downstream antenna node; these dielectric waveguide interfaces are oriented to the right in FIG. 4, and are shown in FIG. 4 as combined with the rightward facing dielectric waveguide interfaces, as dielectric waveguide interfaces 42.

APU 22 further comprises first RF circuitry and corresponding one or more first antennas configured to selectively transmit, over the air, RF signals received via the first dielectric waveguide interface or to receive RF signals via the one or more first antennas and couple the received RF signals to the first dielectric waveguide interfaces. Similarly, APU 22 comprises second RF circuitry and corresponding one or more second antennas configured to selectively transmit, over the air, RF signals received via the second dielectric waveguide interface or to receive RF signals via the one or more second antennas and couple the received RF signals to the second dielectric waveguide interface, as well as third RF circuitry configured to selectively (a) forward RF signals received via the first and second dielectric waveguide interfaces to the third and fourth dielectric waveguide interfaces respectively, and (b) forward RF signals received via the third and fourth dielectric waveguide interfaces to the first and second dielectric waveguide interfaces, respectively. In FIG. 4, the first and second RF circuitry are shown as combined in antenna circuitry 40, while the third RF circuitry forms part of the dielectric waveguide interface circuitry 42 shown in the figure. Further details of the RF and switching circuitry that may make up all of this RF circuitry are shown in FIG. 6.

APU 22 comprises switching circuitry configured to, responsive to a control signal instructing the antenna node to loopback an RF test signal, loop back an RF test signal received via the first dielectric waveguide interface to the second dielectric waveguide interface. This switching circuitry may take various configurations, in different embodiments. In some embodiments, this switching circuitry forms from the dielectric waveguide interface circuitry to one or more transmitting antennas and then back again from one or more receiving antennas. Thus, the switching circuitry in an embodiment like that shown in FIG. 6 may comprise SW 130, switch/combiner (S/C) 114, S/C 110, SW 106, and SW 110, in Part A of the APU 22, e.g., to provide for transmission of the RF test signal over one or more horizontally polarized antennas. The switching circuitry in these embodiments will comprise the same switches on Part B, but oriented to route a signal received via one or more antennas on the Part B side of APU 22 to the dielectric waveguide interface circuitry and back towards the CPU.

APU 22 and variations thereof may be configured to carry out any of the APU-related methods and techniques described herein, including those described above in connection with FIG. 14.

Advantages of various embodiments of the techniques and apparatus described above include that the equalization of distortion in the dielectric wave guide will make it possible to use single carrier modulation with higher bandwidths. A single up- and down-conversion hardware (in the CPU) can be used, instead of parallel up and down conversions in each APU. The length of the dielectric wave guides can be decided at installation time, since the calibration procedure is implemented as self-calibration at start-up and runtime of the system. The compensation algorithm can compensate both for delay ripple as well as for absolute delay adjustment. Absolute delay adjustment is needed to make sure that two adjacent systems are time aligned at the antenna transmission point. The compensation algorithm can also secure that the correct drive strength is applied for each dielectric waveguide driver. This allows for a lowered power consumption, when two APUs are placed close to each other. Thus, for example, when the average loss between two APUs or between the CPU and the first APU is relatively short, then the amplifier (that drives the antennas connected to the dialectic waveguide) gain and bias can be reduced. For longer runs, the gains of amplifiers amplifying the signals launched into the dielectric waveguides can be reduced.

REFERENCES

[1] Linköping Studies in Science and Technology Licentiate Thesis No. 1817; Signal Processing Aspects of Cell-Free Massive MIMO; Giovanni Interdonato.
[2] U.S. Pat. No. 9,960,849 B1.

Abbreviations

ADC Analogue to Digital Conversion
APU Antenna Processing Unit
AAS Active Antennas System
BS Base Station
CPU Central Processing Unit
DAC Digital to Analogue Conversion
FFT Fast Fourier Transform
IFFT Inverse Fast Fourier Transform
LNA Low noise amplifier
PA Power amplifier
S/C Split combine
SW Switch
WG Wave Guide
WFG Wave Form Generator

The invention claimed is:

1. A method of determining calibration parameters to correct for frequency responses of one or more dielectric waveguides coupling a control unit to a first antenna node or to a series of antenna nodes including the first antenna node, the method comprising:
    transmitting, via a first dielectric waveguide coupling the control unit to the first antenna node, a radiofrequency (RF) test signal having a signal bandwidth covering a bandwidth of interest;
    receiving, via a second dielectric waveguide coupling the control unit to the first antenna node, a looped-back version of the transmitted RF test signal; and
    estimating a first one-way frequency response corresponding to the first dielectric waveguide, based on the RF test signal and the received loop-back version of the transmitted RF test signal.

2. The method of claim 1, wherein the first one-way frequency response corresponding to the first dielectric waveguide represents an estimated frequency response for the first dielectric waveguide alone.

3. The method of claim 2, wherein estimating the first one-way frequency response corresponding to the first dielectric waveguide comprises determining a two-way frequency response based on the RF test signal and the received loop-back version of the transmitted RF test signal, adjusting the two-way frequency response to account for an estimated frequency response of a loop-back path in the first antenna node, and calculating the first one-way frequency response from the adjusted two-way frequency response based on an assumption that frequency responses corresponding to the first and second dielectric waveguides are equal.

4. The method of claim 3, wherein the estimated frequency response of the loop-back path in the first antenna node accounts for at least one:
    over-the-air coupling between at least a first antenna in the first antenna node, from which the RF test signal is transmitted over the air, and at least a second antenna in the first antenna node, at which the RF test signal is received after transmission over the air; and
    an estimated frequency response of a switched path coupling the first dielectric waveguide to the second dielectric waveguide, through the first antenna node.

5. The method of claim 4, wherein the estimated frequency response of the loop-back path in the first antenna node accounts for over-the-air coupling between the first antenna and the second antenna, and wherein the first and second antennas have first and second polarizations, respectively, the first and second polarizations being at least approximately orthogonal.

6. The method of claim 2, the method further comprising:
    calculating an amplitude correction parameter and/or a phase correction parameter for each of two or more frequencies or frequency ranges within the bandwidth of interest, based on the first one-way frequency response; and
    applying the calculated amplitude correction parameters and/or phase correction parameters to RF signals subsequently sent to the first antenna node, via the first and/or second dielectric waveguide, for transmission by the first antenna node, and/or applying the calculated amplitude correction parameters and/or phase correction parameters to RF signals received from the first antenna node, via the first and/or second dielectric waveguide.

7. The method of claim 1, wherein the first one-way frequency response corresponding to the first dielectric waveguide represents an estimated frequency response for a series of two or more dielectric waveguides, the series comprising the first dielectric waveguide and one more additional waveguides between the first antenna node and each of one or more additional antenna nodes coupled in series with first antenna node, via respective ones of the one or more additional waveguides.

8. The method of claim 7, wherein estimating the first one-way frequency response corresponding to the first dielectric waveguide comprises determining a two-way frequency response based on the RF test signal and the received loop-back version of the transmitted RF test signal, adjusting the two-way frequency response to account for a frequency response of a loop-back path in the additional antenna node from which the transmitted RF test signal is looped back, and calculating the first one-way frequency response from the adjusted two-way frequency response based on an assumption that frequency responses corresponding to the first and second dielectric waveguides are equal.

9. The method of claim 8, wherein the estimated frequency response of the loop-back path in the additional antenna node accounts for at least one of:
   over-the-air coupling between at least a first antenna in the additional antenna node, from which the RF test signal is transmitted over the air, and at least a second antenna in the additional antenna node, at which the RF test signal is received after transmission over the air; and
   an estimated frequency response of a switched loopback path through the additional node.

10. The method of claim 7, the method further comprising:
   calculating an amplitude correction parameter and/or a phase correction parameter for each of two or more frequencies or frequency ranges within the bandwidth of interest, based on the first one-way frequency response; and
   applying the calculated amplitude correction parameters and/or phase correction parameters to RF signals subsequently sent to the additional antenna node from which the transmitted RF test signal is looped back, via the first and/or second dielectric waveguide, for transmission by the additional antenna node from which the transmitted RF test signal is looped back, and/or applying the calculated amplitude correction parameters and/or phase correction parameters to RF signals received from the additional antenna node from which the transmitted RF test signal is looped back, via the first and/or second dielectric waveguide.

11. The method of claim 1, wherein the first one-way frequency response corresponding to the first dielectric waveguide represents an estimated frequency response for the first dielectric waveguide alone, the method further comprising:
   re-transmitting the RF test signal via the first dielectric waveguide coupling the control unit to the first antenna node;
   receiving, via the second dielectric waveguide coupling the control unit to the first antenna node, a looped-back version of the retransmitted RF test signal; and
   estimating a second one-way frequency response corresponding to the first (or second) dielectric waveguide, based on the retransmitted RF test signal and the received loop-back version of the retransmitted RF test signal, the second one-way frequency response representing a frequency response for a series of two or more dielectric waveguides, the series comprising the first dielectric waveguide or the second dielectric waveguide and one more additional waveguides between the first antenna node and each of one or more additional antenna nodes coupled in series with first antenna node, via respective ones of the one or more additional waveguides.

12. A method, in a first antenna node coupled to an upstream antenna node or to a control unit via first and second dielectric waveguides and coupled to a downstream antenna node via third and fourth dielectric waveguides, the antenna node comprising (i) first radiofrequency (RF) circuitry and corresponding one or more antennas for selectively transmitting RF signals received via the first dielectric waveguide or receiving RF signals via the one or more antennas and coupling the received RF signals to the first dielectric waveguide, and (ii) second RF circuitry and corresponding one or more antennas for selectively transmitting RF signals received via the second dielectric waveguide or receiving RF signals via the one or more antennas and coupling the received RF signals to the second dielectric waveguide, and (iii) third RF circuitry for selectively forwarding RF signals received via the first and second dielectric waveguides to the third and fourth dielectric waveguides or forwarding RF signals received via the third and fourth dielectric waveguides to the first and second dielectric waveguides, the method comprising:
   receiving, from the control unit or the upstream antenna node, a signal instructing the first antenna node to loopback an RF test signal; and,
   in response to the signal, looping back an RF test signal received via the first dielectric waveguide to the second dielectric waveguide.

13. The method of claim 12, wherein looping back the RF test signal comprises one of:
   transmitting the RF test signal over the air, using the first RF circuitry and one or antennas corresponding to the first RF circuitry, and receiving the transmitted RF test signal, using the second RF circuitry and one or antennas corresponding to the second circuitry; and
   routing the RF test signal from the first dielectric waveguide to the second dielectric waveguide via a loopback switch coupling the first dielectric waveguide to the second dielectric waveguide.

14. The method of claim 12, wherein the method further comprises:
   receiving, from the control unit or the upstream antenna node, a second signal, the second signal instructing the first antenna node to repeat an RF test signal for a downstream antenna node; and,
   in response to the second signal, forwarding RF signals received via the first dielectric waveguide to the third dielectric waveguide and forwarding RF signals received via the fourth waveguide to the second dielectric waveguide.

15. A control node for determining calibration parameters to correct for frequency responses of one or more dielectric waveguides coupling the control node to a first antenna node or to a series of antenna nodes including the first antenna node, the control node comprising:
   first and second dielectric waveguide interfaces, each being configured to selectively transmit and receive radiofrequency (RF) signals via a respective dielectric waveguide, to and from a first antenna node;
   first radiofrequency (RF) circuitry operatively coupled to the first dielectric waveguide interface and configured to selectively transmit RF signals via the first dielectric waveguide interface or receive RF signals via the first dielectric waveguide interface;
   second RF circuitry operatively coupled to the second dielectric waveguide interface and configured to selectively transmit RF signals via the second dielectric waveguide interface or receive RF signals via the first dielectric waveguide interface;
   baseband circuitry and upconversion circuitry configured to generate RF signals from baseband signals; and processing circuitry operatively coupled to and configured to control the first and second RF circuitry, baseband circuitry, and upconversion circuitry to:
- transmit, via the first dielectric waveguide an RF test signal having a signal bandwidth covering a bandwidth of interest;
- receive, via the second dielectric waveguide interface, a looped-back version of the transmitted RF test signal; and
- estimate a first one-way frequency response corresponding to the first (or second) dielectric waveguide interface, based on the RF test signal and the received loop-back version of the transmitted RF test signal.

16. The control node of claim 15, wherein the processing circuitry is configured to estimate the first one-way frequency response corresponding to the first dielectric waveguide interface by determining a two-way frequency response based on the RF test signal and the received loop-back version of the transmitted RF test signal, adjusting the two-way frequency response to account for an estimated frequency response of a loop-back path in the first antenna node, and calculating the first one-way frequency response from the adjusted two-way frequency response based on an assumption that frequency responses corresponding to the first and second dielectric waveguides are equal.

17. The control node of claim 16, wherein the estimated frequency response of the loop-back path in the first antenna node accounts for at least one of:
- over-the-air coupling between at least a first antenna in the first antenna node, from which the RF test signal is transmitted over the air, and at least a second antenna in the first antenna node, at which the RF test signal is received after transmission over the air; and
- an estimated frequency response of a switched path coupling the first dielectric waveguide to the second dielectric waveguide, through the first antenna node.

18. The control node of claim 17, wherein the estimated frequency response of the loop-back path in the first antenna node accounts for over-the-air coupling between the first antenna and the second antenna, and wherein the first and second antennas have first and second polarizations, respectively, the first and second polarizations being at least approximately orthogonal.

19. The control node of claim 15, wherein the processing circuitry is further configured to:
- calculate an amplitude correction parameter and/or a phase correction parameter for each of two or more frequencies or frequency ranges within the bandwidth of interest, based on the first one-way frequency response; and
- applying the calculated amplitude correction parameters and/or phase correction parameters to RF signals subsequently sent to the first antenna node, via the first and/or second dielectric waveguide interfaces, for transmission by the first antenna node, and/or applying the calculated amplitude correction parameters and/or phase correction parameters to RF signals received from the first antenna node, via the first and/or second dielectric waveguide interfaces.

20. The control node of claim 15, wherein the first one-way frequency response corresponding to the first dielectric waveguide represents an estimated frequency response for only a first dielectric waveguide coupling the control node to the first antenna node, wherein the processing circuitry is further configured to:
- re-transmit the RF test signal via the first dielectric waveguide interface;
- receive, via the second dielectric waveguide interface, a looped-back version of the retransmitted RF test signal; and
- estimate a second one-way frequency response corresponding to the first (or second) dielectric waveguide interface, based on the retransmitted RF test signal and the received loop-back version of the retransmitted RF test signal, the second one-way frequency response representing a frequency response for a series of two or more dielectric waveguides, the series comprising the first dielectric waveguide and one more additional waveguides between the first antenna node and each of one or more additional antenna nodes coupled in series with first antenna node, via respective ones of the one or more additional waveguides.

* * * * *